(12) United States Patent
Reinmuth

(10) Patent No.: US 9,909,874 B2
(45) Date of Patent: Mar. 6, 2018

(54) ROTATION RATE SENSOR

(71) Applicant: Robert Bosch GmbH, Stuttgart (DE)

(72) Inventor: Jochen Reinmuth, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 126 days.

(21) Appl. No.: 14/783,792

(22) PCT Filed: Apr. 7, 2014

(86) PCT No.: PCT/EP2014/056892
§ 371 (c)(1),
(2) Date: Oct. 9, 2015

(87) PCT Pub. No.: WO2014/166851
PCT Pub. Date: Oct. 16, 2014

(65) Prior Publication Data
US 2016/0047654 A1 Feb. 18, 2016

(30) Foreign Application Priority Data

Apr. 11, 2013 (DE) .................. 10 2013 206 414

(51) Int. Cl.
*G01C 19/56* (2012.01)
*G01C 19/5712* (2012.01)
(Continued)

(52) U.S. Cl.
CPC ....... *G01C 19/5712* (2013.01); *G01C 19/574* (2013.01); *G01C 19/5719* (2013.01)

(58) Field of Classification Search
CPC ............ G01C 19/5712; G01C 19/5719; G01C 19/574; G01C 19/56
See application file for complete search history.

(56) References Cited

U.S. PATENT DOCUMENTS 7,302,847 B2 * 12/2007 Ito ..................... G01C 19/5719
                                                          73/504.12
7,934,423 B2 * 5/2011 Nasiri ................ G01P 15/0802
                                                          73/514.02
(Continued)

FOREIGN PATENT DOCUMENTS

CN          101939653 A      1/2011
CN          102334010 A      1/2012
(Continued)

OTHER PUBLICATIONS

International Search Report for PCT/EP2014/056892, dated Jun. 24, 2014.

*Primary Examiner* — Helen Kwok
(74) *Attorney, Agent, or Firm* — Norton Rose Fulbright US LLP; Gerard Messina

(57) ABSTRACT

A micromechanical rotation rate sensor includes: a substrate having a main plane of extension; a first Coriolis element; a second Coriolis element; a drive device for deflecting the first and second Coriolis elements from a neutral position; and a detection device. The first Coriolis element, with regard to a first axis extending in parallel to the main plane of extension, has a mass-symmetrical design with respect to the second Coriolis element. The first and second Coriolis elements have a common main plane of extension, and in the neutral position the shared main plane of extension extends in parallel to the main plane of extension of the substrate. The first and second Coriolis elements each have a mass-symmetrical design with respect to a second axis extending perpendicularly with respect to the first axis. The first and second Coriolis elements are drivable by the drive device.

9 Claims, 26 Drawing Sheets

(51) Int. Cl.
*G01C 19/5719* (2012.01)
*G01C 19/574* (2012.01)

(56) References Cited

U.S. PATENT DOCUMENTS

| | | | |
|---|---|---|---|
| 8,141,424 B2* | 3/2012 | Seeger | G01C 19/5719 |
| | | | 73/504.12 |
| 8,347,717 B2* | 1/2013 | Seeger | G01C 19/5719 |
| | | | 73/504.12 |
| 9,097,524 B2* | 8/2015 | Seeger | G01C 19/5733 |
| 2003/0164041 A1 | 9/2003 | Jeong et al. | |
| 2008/0115579 A1 | 5/2008 | Seeger et al. | |
| 2010/0095770 A1 | 4/2010 | Hsu | |
| 2010/0263446 A1 | 10/2010 | Tamura et al. | |
| 2015/0053001 A1* | 2/2015 | Frey | B81B 3/0027 |
| | | | 73/504.12 |

FOREIGN PATENT DOCUMENTS

| | | |
|---|---|---|
| CN | 102369414 A | 3/2012 |
| CN | 103033177 A | 4/2013 |

\* cited by examiner

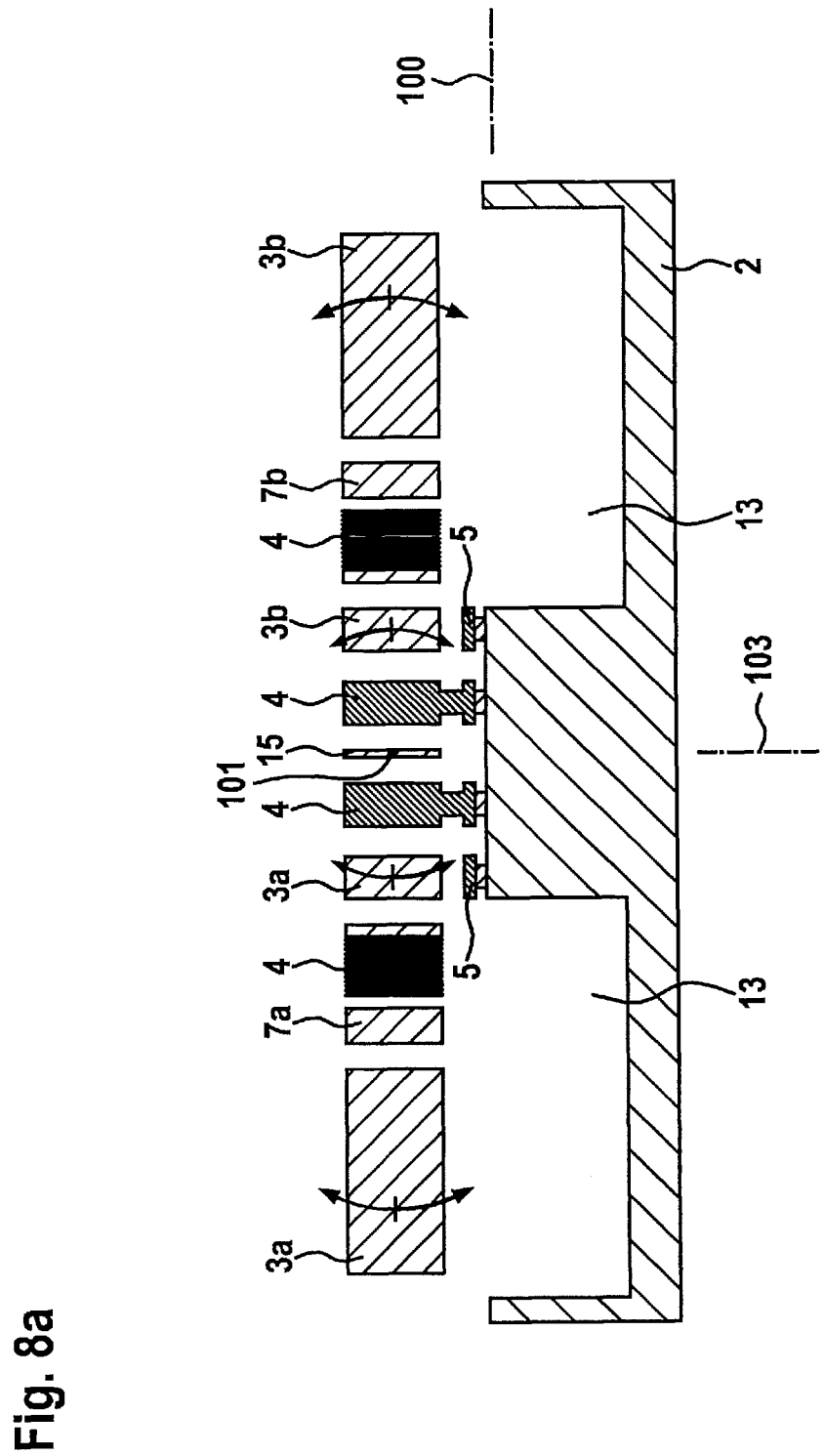

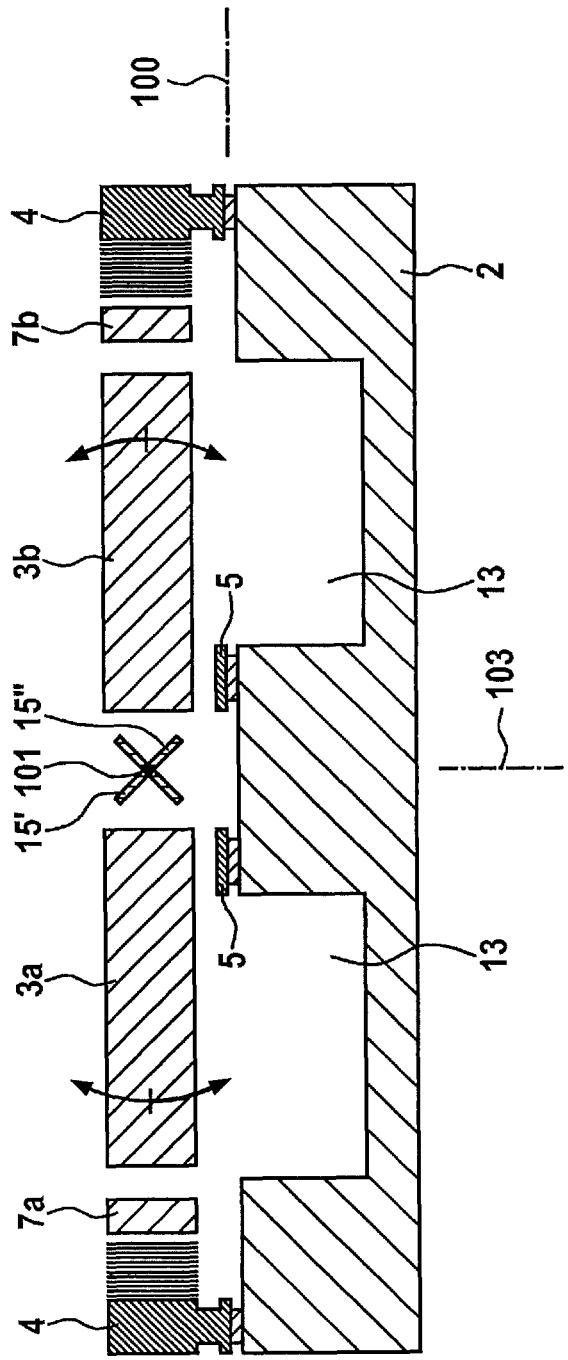

ROTATION RATE SENSOR

BACKGROUND OF THE INVENTION

1. Field of the Invention

The present invention is directed to a micromechanical structure configured as a rotation rate sensor.

2. Description of the Related Art

Micromechanical structures are well known from the related art, and are used for acceleration sensors or rotation rate sensors, for example. Micromechanical structures customarily include movable silicon structures which are produced by an etching process, in which trenches having a large aspect ratio, i.e., a large ratio of the depth of the trenches to their lateral extension, are etched into a silicon layer, and further layers below the movable structures are optionally removed. The movable structures may be subsequently protected against mechanical influences by a cap substrate which is applied via a bonding process.

It is problematic that the trenches, due to manufacturing, typically do not have straight, in particular vertical, walls; rather, due to the nature of the etching process, a so-called trench angle cannot be avoided. In addition, for protection from damage and/or external influences, the finished micromechanical structures are often installed in a housing and/or soldered to a circuit board. As a result, the micromechanical structures are subjected to tensions, in particular bending, in addition to static tensions as well as temperature-dependent tensions.

Rotation rate sensors are likewise known from the related art. Micromechanical structures are being increasingly used for this purpose. In rotation rate sensors, customarily two masses are driven to undergo an antiparallel movement. If a rotation rate acts on the masses perpendicularly with respect to the direction of movement, the masses are deflected by the Coriolis force. This deflection is measured, and on this basis the rotation rate may be deduced. Due to the antiparallel deflection of the masses, a distinction may be made between a linear acceleration and a rotation rate. It is known to measure the counterforce, in particular the electrostatic counterforce, required for resetting the position (closed-loop control), or the change in capacitance which is induced by a change in distance from a structure (open-loop operation).

Due to the above-mentioned manufacturing inaccuracies, it is difficult to achieve movements exactly in parallel to a plane, since components of motion perpendicular to the desired direction of movement also occur due to the variation in the trench angles about a direction. This results in wobbling, which in turn results in an error signal, the so-called quadrature.

BRIEF SUMMARY OF THE INVENTION

The micromechanical structure according to the present invention has the advantage over the related art that it has no quadrature, or at least has a much lower quadrature, and in addition is very insensitive to mechanical and/or temperature-induced tensions, in particular bending. Furthermore, the micromechanical structure according to the present invention has a compact installation space, thus saving on manufacturing and material costs. Moreover, the micromechanical structure according to the present invention makes use of manufacturing methods which are already known and established, so that it is easily and cost-effectively producible. The first Coriolis element and the second Coriolis element are preferably strongly coupled in such a way that they act as a rigid body, in a manner of speaking, as the result of which error signals may advantageously be avoided in a particularly simple manner, since the movement of the masses is now the same as the movement of a single mass, and possible errors are thus compensated for. Due to the first Coriolis element and the second Coriolis element having the same design, i.e., in particular having a mass-symmetrical design with respect to one another, and moving synchronously with their shared main plane of extension consistently maintained, possible errors are compensated for, and an error signal may thus be excluded. The rotational vibration about the first axis allows a virtually wobble-free movement, even when there is a comparatively large variation in the trench angles. In addition, a deflection in parallel to the main plane of extension of the substrate may be measured very accurately, so that a particularly accurate measurement of an applied rotation rate is possible using the micromechanical structure according to the present invention. The first and the second deflection elements are particularly preferably strongly coupled in such a way that they act as a rigid body, in a manner of speaking, and in particular the first and the second deflection elements are designed as a single deflection element. Errors are thus advantageously compensated for in an even better manner. The first Coriolis element and the second Coriolis element are very particularly preferably situated essentially near the first axis, or are connected to the substrate via means, particular torsion springs situated on the axis. Free movement which is not influenced by disturbances is thus made possible in a particularly advantageous manner.

According to one preferred specific embodiment, the first axis includes at least one one- or multi-part torsion spring, in particular the length of the torsion spring being greater than the height of the torsion spring, and the height of the torsion spring being greater than the width of the torsion spring. The torsion spring is particularly preferably oriented in parallel to the first axis. It is thus advantageously possible to couple the movements of the first and second Coriolis elements and/or the movements of the first and second deflection elements with one another. As components which are integrated into the micromechanical structure, torsion springs are particularly easily manufacturable with a compact installation space. The first axis very particularly preferably has a two-part torsion spring, the first part having a mass-symmetrical design with respect to the second part. An even higher degree of symmetry of the micromechanical structure is thus made possible, specifically with regard to the deflection effectuated by the action of force of the Coriolis force, which further reduces the quadrature.

According to one preferred specific embodiment, the micromechanical structure is manufacturable by a surface micromechanical process. This advantageously makes it possible to use known, proven methods in the manufacture of the micromechanical structure, which allows low manufacturing costs.

According to one preferred specific embodiment, the drive device includes electrodes, in particular surface electrodes situated in the vicinity of the first axis, having a main plane of extension in parallel to the main plane of extension of the substrate, the distance of the drive device from the first axis preferably being less than 40%, particularly preferably being less than 30%, and very particularly preferably less than 20%, of the extension of the first and/or second Coriolis element(s) along the second axis. It is thus advantageously possible to design the drive device with a compact installation space, and to ensure a drive of the first and second Coriolis elements which is largely free of disturbances. An arrangement near the first axis advantageously allows a central fastening of the structures to the substrate, as the result of which interference signals which result in particular from tensions (in particular bending of the substrate) may be avoided or at least minimized.

According to one preferred specific embodiment, the detection device includes electrodes. The detection device particularly preferably includes first finger electrodes situated in a comb structure, the first deflection element and the second deflection element including second finger electrodes which mesh with the first finger electrodes. Very accurate detection is thus possible in a particularly advantageous manner, resulting in very accurate measurement of the rotation rate. The finger electrodes, which mesh with one another in a comb-like manner, have high sensitivity in open-loop operation as well as in closed-loop operation. The first and second Coriolis elements also very particularly preferably include finger electrodes which mesh with corresponding counter electrodes of the detection device. Even more accurate measurement and compensation for error signals are made possible by comparing the signals of the Coriolis elements and the deflection elements. Even more preferably, at least two, in particular four or more, finger electrodes situated in a comb-like manner are provided which are situated in particular in such a way that two comb structures on the side of the first Coriolis element in each case are situated opposite from two respective comb structures on the side of the second Coriolis element, and the respective two comb structures of a Coriolis element are configured in such a way that the difference in the signals of the respective two comb structures is determined as a signal for the rotation rate. Due to the high degree of symmetry of the system, the micromechanical structure is particularly advantageously even more insensitive to external disturbances, in particular interference signals.

According to one preferred specific embodiment, the detection device and/or the first Coriolis element and the second Coriolis element and/or in particular the first deflection element and the second deflection element is/are situated essentially circumferentially around at least one central substrate suspension. This means that the first and second Coriolis elements and/or the first and second deflection elements form a ring structure around the detection device. In particular, the suspension of the individual elements on the substrate is therefore situated near the center of the micromechanical structure, in particular near the center of the first axis. A central connection to the substrate is thus advantageously possible, so that a particularly high level of insensitivity to tensions, in particular bending, is made possible.

According to one preferred specific embodiment, the first Coriolis element includes multiple segments and the second Coriolis element includes multiple segments, in particular adjacent segments of the first Coriolis element being coupled by torsion springs, and adjacent segments of the second Coriolis element being coupled by torsion springs. Due to the resonant coupling of the segments, it is thus advantageously possible to allow a particularly strong deflection of the first and second Coriolis elements, so that even small signals are advantageously better detectable.

According to one preferred specific embodiment, the substrate has such recesses that the first Coriolis element and the second Coriolis element have a larger maximum deflection angle of the rotational vibration than is the case without recesses. These recesses are particularly preferably designed as cavities, in particular having a U-shaped cross section. The base of the cavity is very particularly preferably provided so that it rises toward the first axis. However, it is also conceivable to provide the recesses only in a very localized manner and/or with an irregular shape; they are always designed in such a way that the first and second Coriolis elements have a larger maximum deflection angle of the rotational vibration. It is thus advantageously made possible for the first and second Coriolis elements to have a larger rotational angle compared to an otherwise identical design of the micromechanical structure, resulting in a greater amplitude of the drive movement, and thus a better signal-to-noise ratio.

According to one preferred specific embodiment, the coupling of the first Coriolis element and of the second Coriolis element to the substrate is "soft" with regard to a rotational vibration about the first axis and with regard to a rotational vibration about the third axis, and is "hard" with regard to a rotational vibration about the second axis, and the coupling of the first deflection element and of the second deflection element to the substrate is soft with regard to a rotational vibration about the third axis, and is hard with regard to a rotational vibration about the first axis and with regard to a rotational vibration about the second axis, and the coupling of the first deflection element to the first Coriolis element and of the second deflection element to the second Coriolis element is soft with regard to a rotational vibration about the first axis, and is hard with regard to a rotational vibration about the second axis and with regard to a rotational vibration about the third axis. In particular, a soft coupling refers to a smaller spring constant of a connection which provides the coupling, in particular a torsion spring or a spiral spring, compared to a hard coupling. The relevant spring constant for a hard coupling particularly preferably differs from that of a soft coupling at least by a factor of two, at least by a factor of five, or by at least one or at least two orders of magnitude. It is thus advantageously possible to exclude or at least minimize error signals, since the detection device is particularly sensitive with regard to the rotational vibration of the first and second deflection elements about the third axis, and is particularly insensitive with regard to other deflections, in particular with regard to rotational vibrations about the first axis. In particular, an influence of the rotational vibration of the first and second Coriolis elements about the first axis on the detection signal is thus largely excluded. The torsion spring which provides the coupling with regard to the first axis preferably has a cross section, i.e., in a plane perpendicular to the first axis, having the shape of a cross, a T, or an inverted T. Good movability with regard to the rotational vibration of the first and second Coriolis elements about the first axis, and at the same time, good transmission of force to the first and second deflection elements with regard to the rotational vibration about the third axis, are thus made possible in a particularly advantageous manner. The torsion spring is advantageously easily manufacturable due to the T shape, and in the case of the inverted T shape is manufacturable, in particular from the polysilicon layer, without additional method steps.

BRIEF DESCRIPTION OF THE DRAWINGS

FIGS. 8a through 8d show schematic representations according to an example of a third specific embodiment of the micromechanical structure according to the present invention.

DETAILED DESCRIPTION OF THE INVENTION

Figure 1:
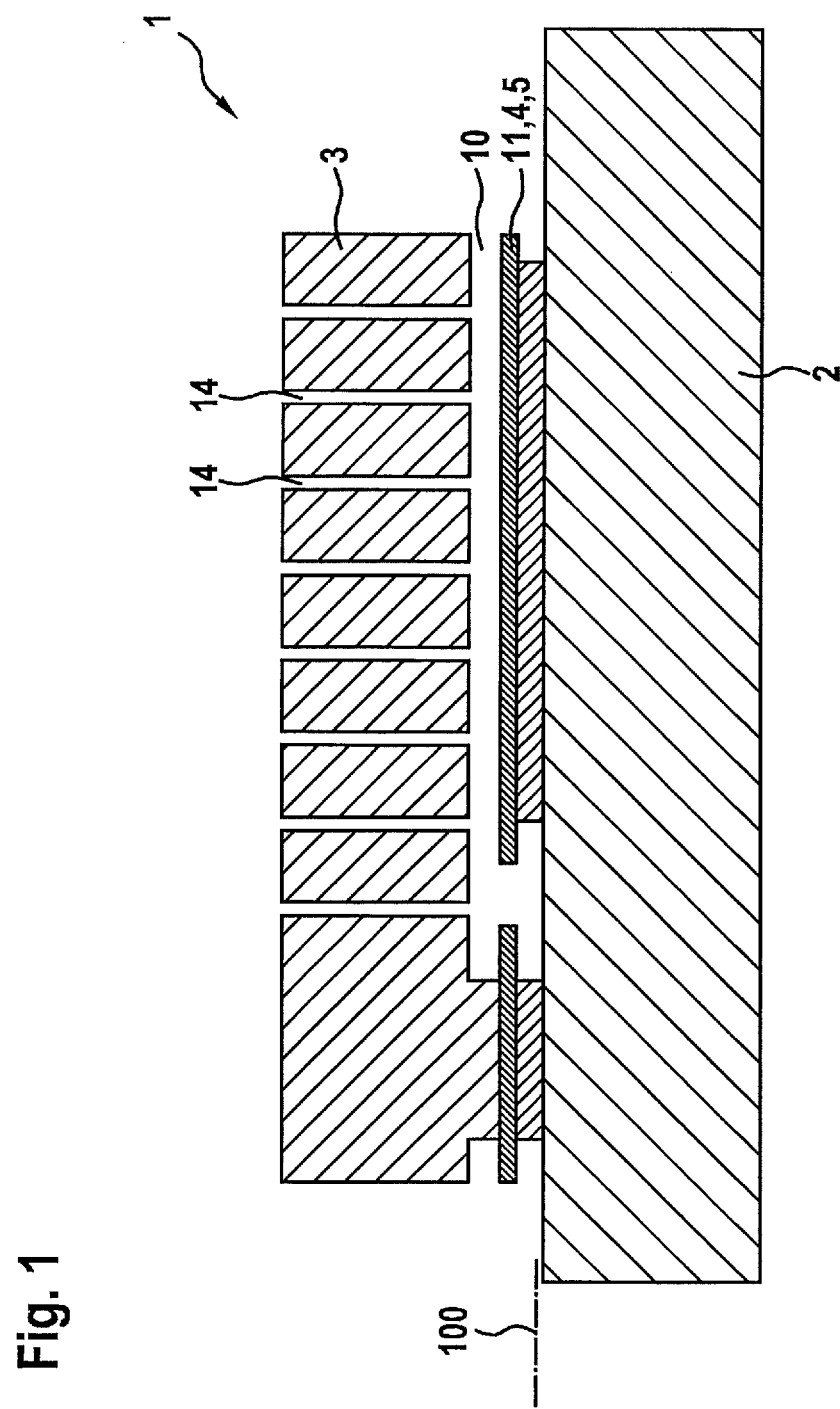
FIGS. 1 through 3 show schematic diagrams of conventional micromechanical structures in the form of sectional views.

The present invention is described with reference to particular statements and with reference to the appended drawings; however, the present invention is not limited to these statements or to these drawings, but, rather, is specified by the patent claims. The drawings are not to be construed as limiting. For purposes of representation, certain elements in the drawings may be enlarged or exaggerated and not represented true to scale.

Unless specifically stated otherwise, the use of an indefinite or definite article with regard to a word in the singular, such as "a/an" or "the," also includes the plural of such a word. The terms "first," "second," and so forth in the description and in the claims are used to distinguish between similar elements, or identical elements which are to be differentiated, and are not necessarily used to describe a chronological or some other sequence. The terms used in this way are basically to be regarded as interchangeable under the appropriate conditions.

Identical parts are always provided with the same reference numerals in the figures, and therefore are generally designated or mentioned only once in each case.

Figure 2:
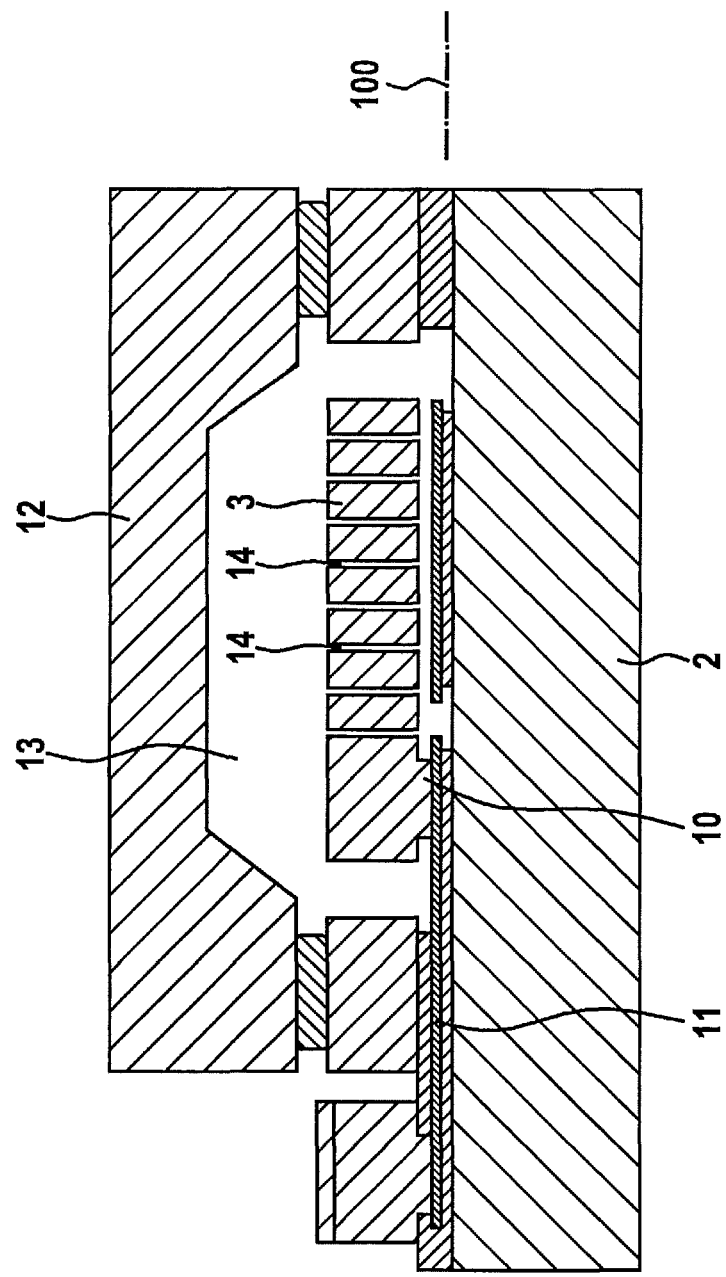
Figure 3:
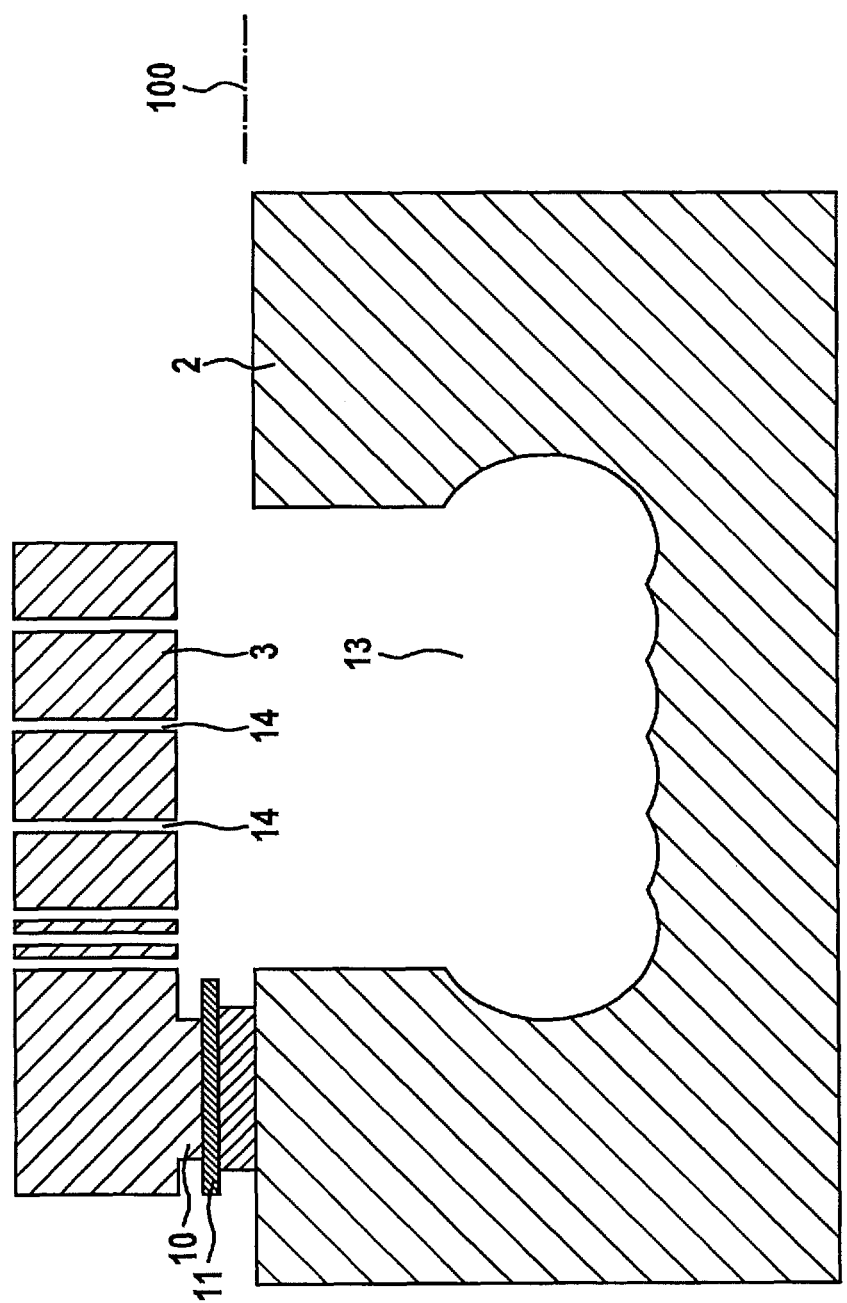

FIG. 1 shows a schematic diagram of a conventional micromechanical structure 1. A movable structure, for example a Coriolis element 3, includes multiple trenches 14 which are produced in a silicon layer by etching steps. A sacrificial layer 10, in particular an oxide layer, is removed beneath the silicon layer in order to allow the movability of the movable structure. The movable structure may be separated from a substrate, usually a silicon substrate, by one or multiple polysilicon layers 11. The polysilicon layers take on various functions. Thus, the movable structure may be connected to the substrate via a polysilicon layer, which is referred to as a substrate suspension, or a polysilicon layer may be segmented by further steps in such a way that it is used as an electrode or as a conductor track. In particular, surface electrodes, for example, may thus be provided as a drive device 5. FIG. 2 shows essentially the same micromechanical structure 1 as shown in FIG. 1, the movable structure being protected by a cap substrate 12 which via a known bonding process is attached to the silicon layer from which the movable structure has also been produced. In addition, a certain freedom of movement of the movable structure on the side facing away from substrate 2 may thus be achieved. FIG. 3 once again illustrates a micromechanical structure 1 similar to that in FIGS. 1 and 2. In contrast to the figures described above, micromechanical structure 1 in FIG. 3 has a cavity 13 in substrate 2, as the result of which the freedom of movement in the direction of the side facing the substrate is also increased.

Figure 4A:
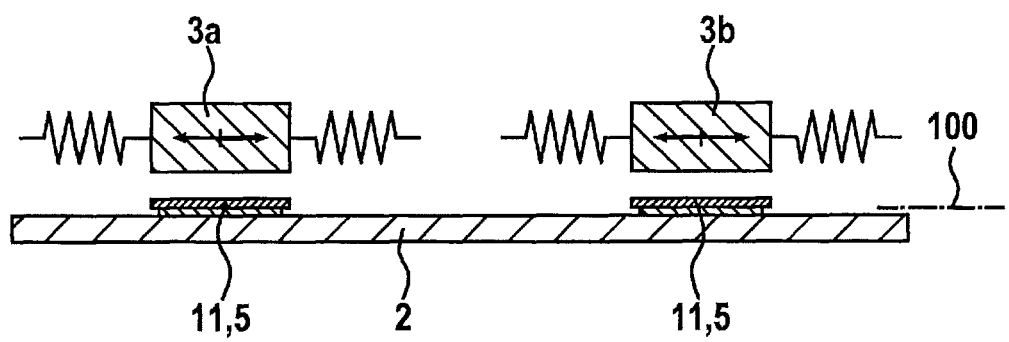
FIGS. 4a through 4d and 5a through 5b show schematic diagrams of conventional rotation rate sensors in the form of sectional views.
Figure 4B:
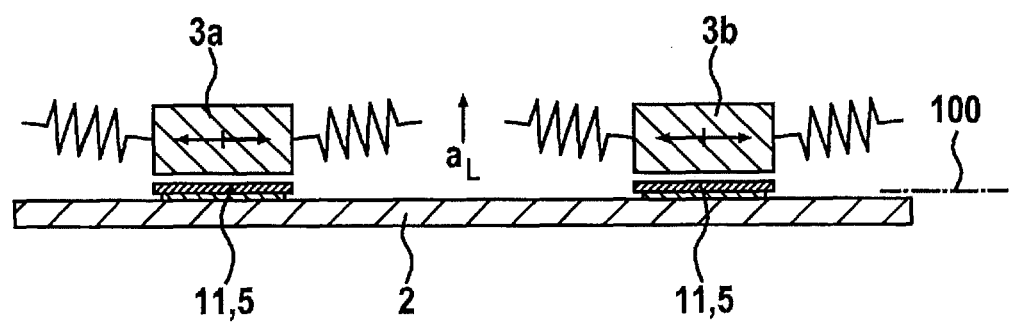
Figure 4C:
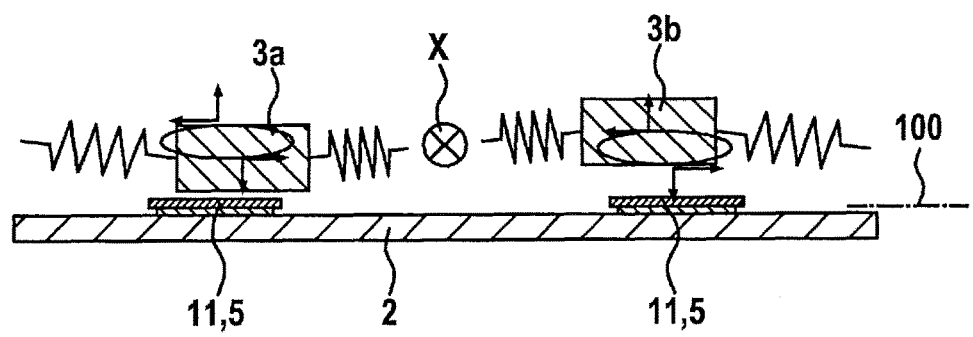
Figure 4D:
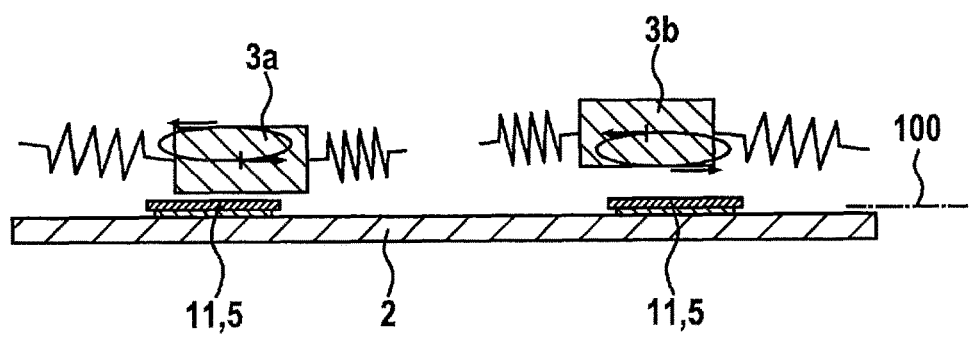

FIG. 4a illustrates a schematic diagram of a conventional rotation rate sensor. A first Coriolis element 3a and a second Coriolis element 3b are driven antiparallel with respect to one another and in parallel to main plane of extension 100 of substrate 2. The antiparallel movement which first Coriolis element 3a and second Coriolis element 3b undergo is illustrated by horizontal arrows. The effect of a linear acceleration $a_L$, whose direction is indicated by the upwardly pointing arrow, on first Coriolis element 3a and second Coriolis element 3b is illustrated in FIG. 4b, while the effect, due to the Coriolis acceleration, of a rotation rate X about an axis perpendicular to the plane of the drawing is illustrated in FIG. 4c. This rotation rate X is denoted by an "X" in a circle. First Coriolis element 3a is deflected to the right, for example, as the result of which acting rotation rate X exerts a Coriolis force on first Coriolis element 3a in a downward direction, i.e., toward substrate 2. Correspondingly, the movement of second Coriolis element 3b is deflected to the left in the plane of the drawing by a Coriolis force which acts on second Coriolis element 3b in an upward direction. From a comparison of FIGS. 4b and 4c it is clear that, due to the antiparallel driven movement of first and second Coriolis elements 3a, 3b, a linear acceleration $a_L$ may be distinguished from a rotation rate X, since in the case of an acting rotation rate, the deflection of first Coriolis element 3a and the deflection of second Coriolis element 3b also take place antiparallel and perpendicular to main plane of extension 100. FIG. 4d shows a schematic diagram of the movement of a conventional rotation rate sensor with inclusion of quadrature components of first Coriolis element 3a and of second Coriolis element 3b. As a result of trenches 14 (see FIG. 1) not extending precisely due to manufacturing reasons, but instead having a variation in their angles, first Coriolis element 3a and second Coriolis element 3b undergo wobbling, not a linear movement, even without an acting rotation rate X.

Figure 5A:
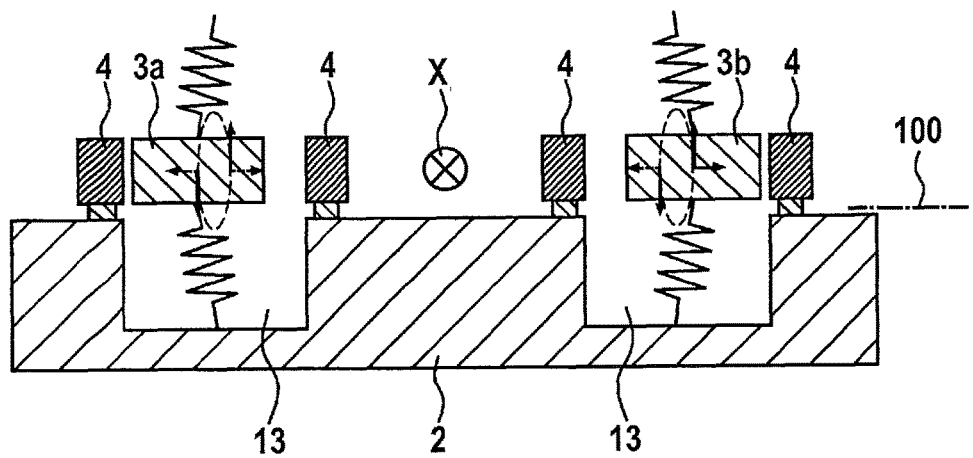
Figure 5B:
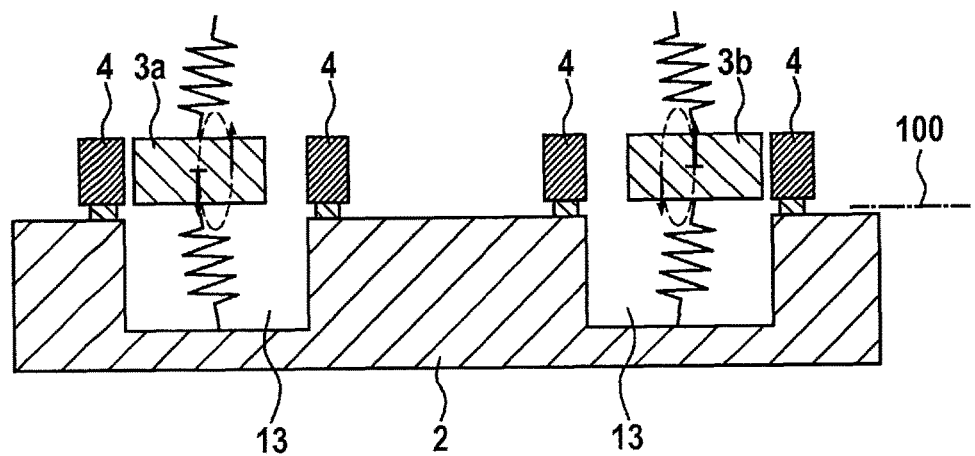

FIG. 5a shows a further schematic diagram of conventional rotation rate sensors. In this specific embodiment, first Coriolis element 3a and second Coriolis element 3b are driven antiparallel in a direction perpendicular to main plane of extension 100 of substrate 2. Under the action of a rotation rate X, whose axis once again is situated perpendicular to the plane of the drawing, first Coriolis element 3a and second Coriolis element 3b are deflected antiparallel and perpendicular to the direction of movement and perpendicular to the axis of rotation rate X. These deflections are detected by detection devices 4. To measure a clear signal, the freedom of movement of first Coriolis element 3a and of second Coriolis element 3b perpendicular to main plane of extension 100 of substrate 2 is increased due to substrate 2 having cavities 13. FIG. 5b shows the same design, without an acting rotation rate X. Due to the variation in the trench angles, despite an absence of an acting rotation rate X, wobbling takes place which is very similar to the movement for an acting rotation rate X. An error signal which is difficult to distinguish from the signal of a rotation rate X is thus generated due to the variation in the trench angles.

FIGS. 6a through 15 show schematic representations according to examples of specific embodiments of micromechanical structure 1 according to the present invention. All illustrated specific embodiments have the following features. A first Coriolis element 3a and a second Coriolis element 3b are movably situated on a substrate 2, first Coriolis element 3a, with regard to a first axis 101 extending in parallel to main plane of extension 100 of substrate 2, having an essentially mass-symmetrical design with respect to second Coriolis element 3b, and first Coriolis element 3a and second Coriolis element 3b having a shared main plane of extension, in a neutral position of first Coriolis element 3a and of second Coriolis element 3b, the shared main plane of extension extending in parallel to main plane of extension 100 of substrate 2, and first Coriolis element 3a and second Coriolis element 3b each having a mass-symmetrical design with respect to a second axis 102 extending perpendicularly with respect to first axis 101. First Coriolis element 3a and second Coriolis element 3b are drivable by drive devices 5, illustrated in the following figures as surface electrodes, to undergo a rotational vibration about first axis 101. In addition, micromechanical structure 1 according to the present invention includes detection devices 4 and a first deflection element 7a and a second deflection element 7b. First Coriolis element 3a and second Coriolis element 3b are strongly coupled in such a way that they act as a rigid body, in a manner of speaking; i.e., in the present case, micromechanical structure 1 includes a Coriolis element 3, in a manner of speaking, which includes first Coriolis element 3a and second Coriolis element 3b, and which is driven to undergo a rotational vibration about first axis 101 with the aid of drive device 5. The suspension of first Coriolis element 3a and of second Coriolis element 3b takes place in all exemplary embodiments via a torsion spring 15, which preferably has a two-part design and which extends along first axis 101, the two parts being mass-symmetrical with respect to one another with regard to second axis 102 in order to exclude error signals resulting from an asymmetry. However, according to other specific embodiments which are not illustrated, it is also provided that the suspension and coupling take place via two or more torsion springs 15 situated mass-symmetrically with respect to one another and/or with respect to first axis 101. First deflection element 7a is coupled to Coriolis element 3a, and second deflection element 7b is coupled to second Coriolis element 3b, via torsion spring 15 (and/or further torsion springs, not illustrated). First deflection element 7a and second deflection element 7b are also preferably strongly coupled in such a way that they act as a rigid body, in a manner of speaking, in particular as a deflection frame 7. Similarly as for Coriolis element 3, here as well reference is made to a first deflection element 7a and a second deflection element 7b for purposes of better description. A deflection of first deflection element 7a and of second deflection element 7b in parallel to main direction of extension 100 of substrate 2, in the sense of a rotational movement about a third axis 103 extending perpendicularly with respect to main plane of extension 100 and extending through the intersection point of first axis 101 and second axis 102, is detected by detection devices 4. In the examples of specific embodiments of micromechanical structure 1 according to the present invention, these detection devices are designed as comb-like finger electrodes which intermesh with corresponding counter finger electrodes. First deflection element 7a and second deflection element 7b include these counter finger electrodes. A cap substrate 12 (see FIG. 2) is not illustrated in any of FIGS. 6a through 15 for reasons of clarity. Each of the described examples of specific embodiments of micromechanical structure 1 preferably includes a cap substrate 12.

Figure 6A:
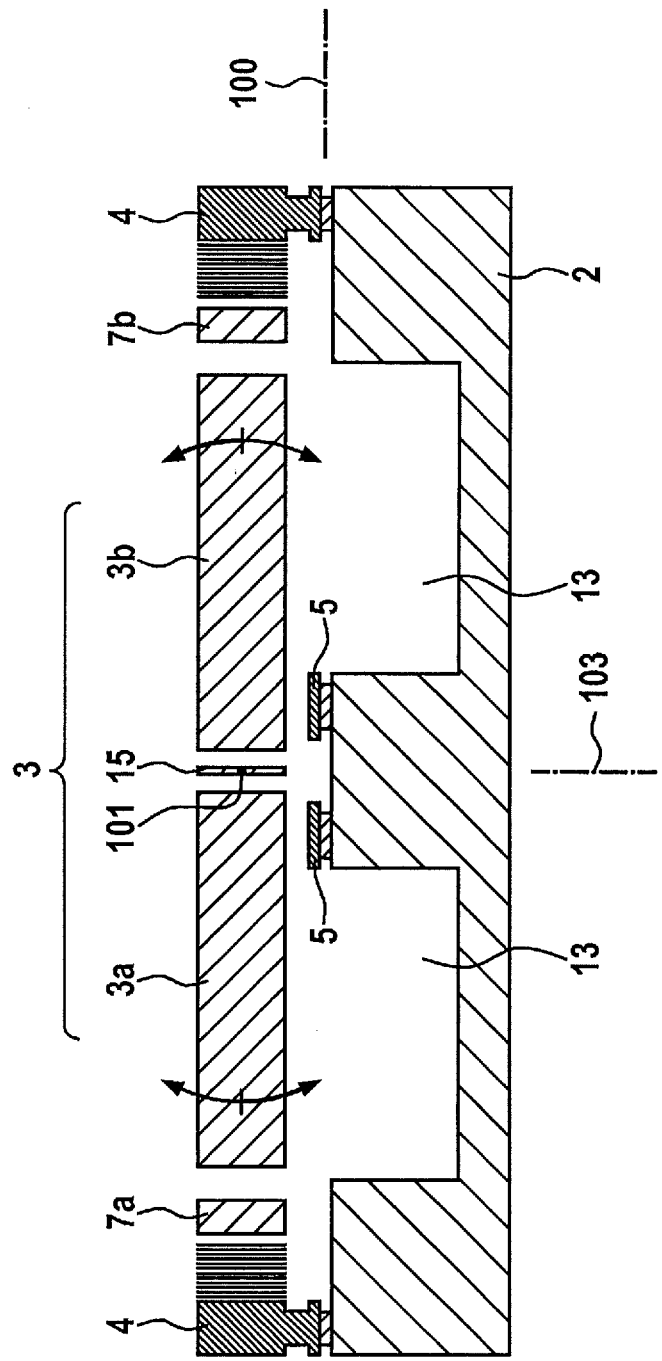
FIGS. 6a through 6d show schematic diagrams according to an example of a first specific embodiment of the micromechanical structure according to the present invention.
Figure 6B:
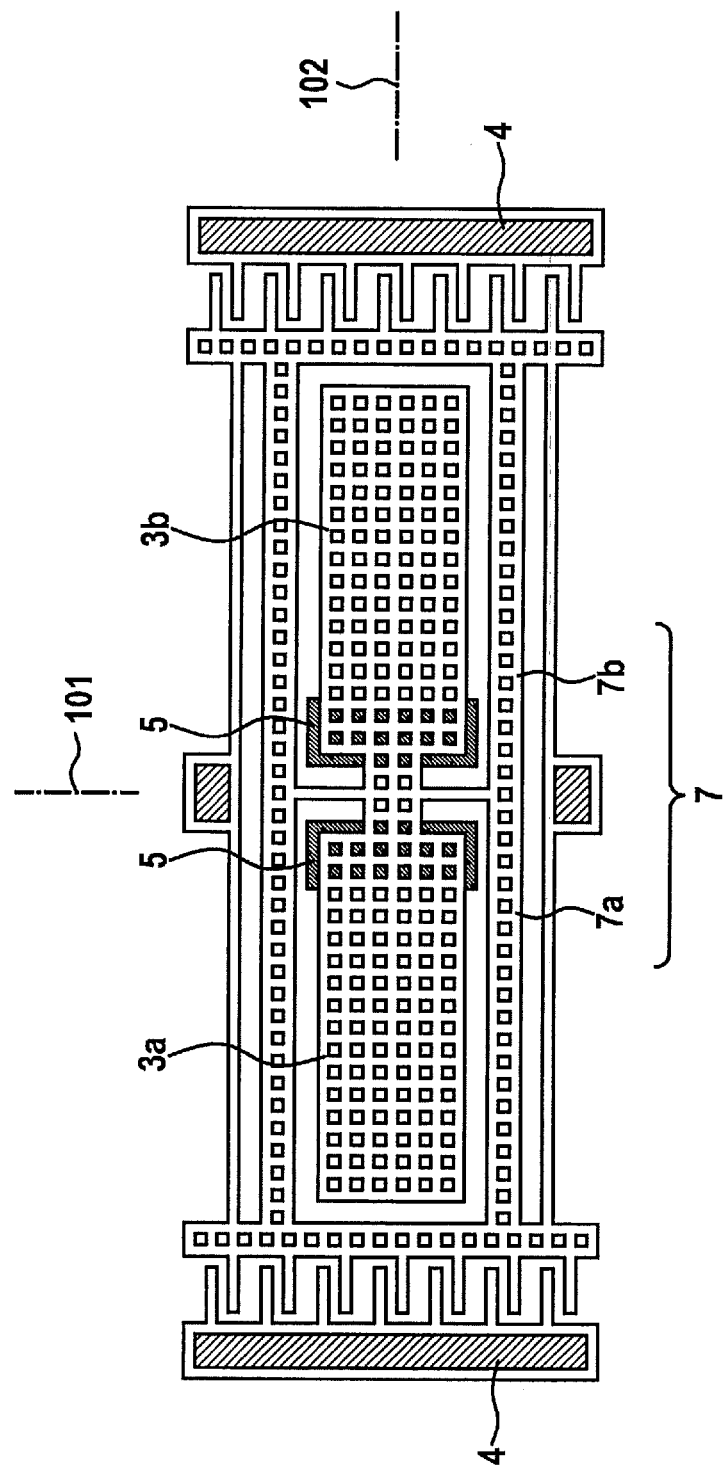
Figure 6C:
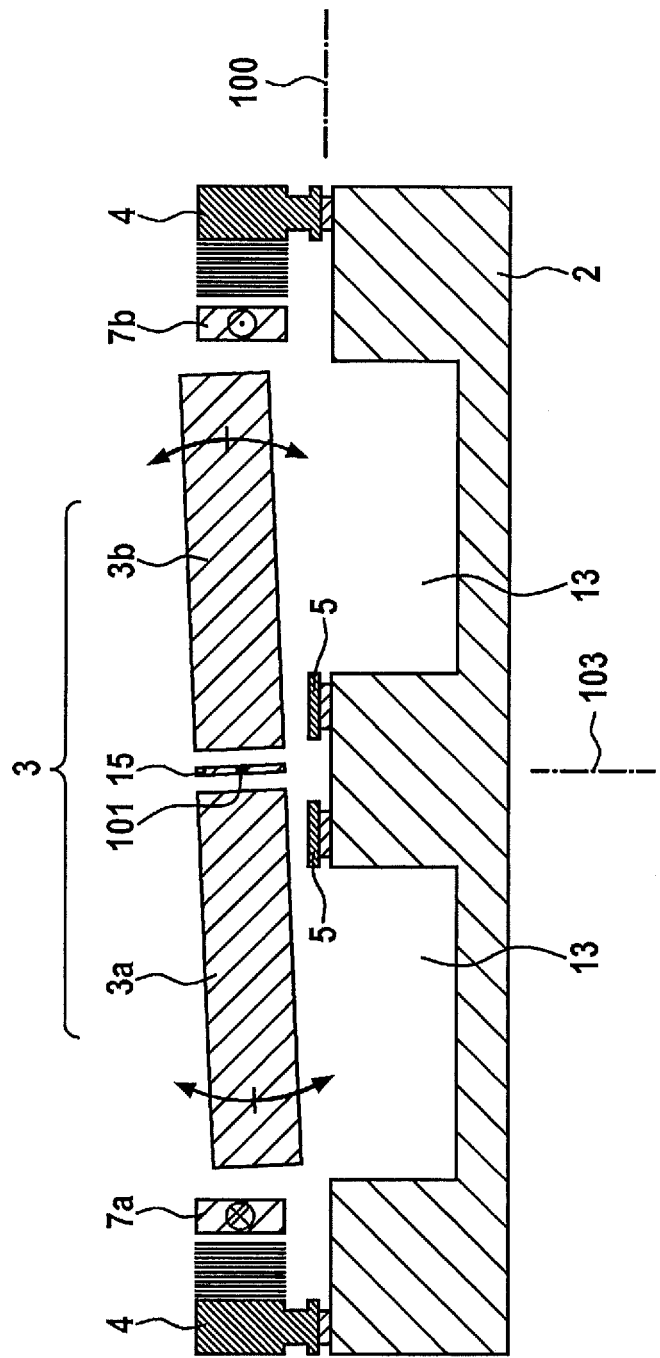
Figure 6D:
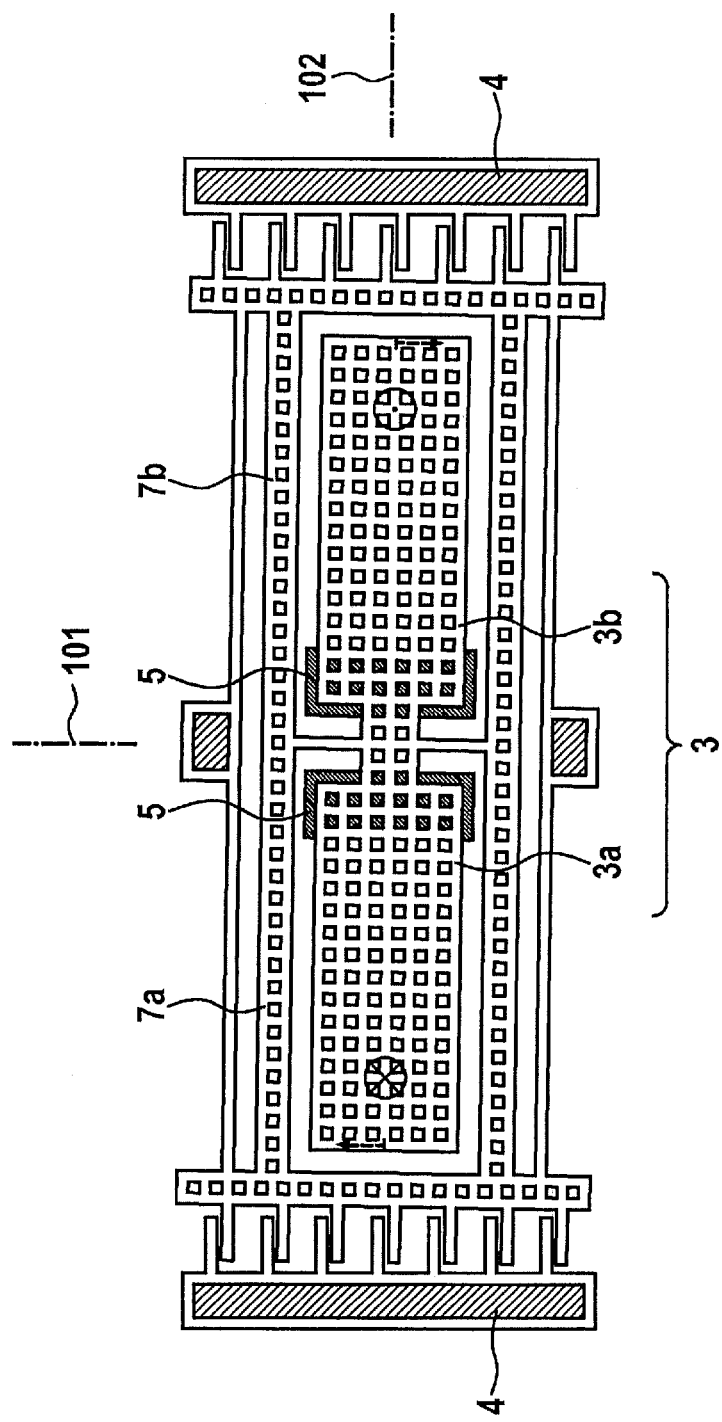

FIG. 6a shows a schematic representation according to an example of a first specific embodiment of micromechanical structure 1 according to the present invention in the neutral position. First axis 101 extends here perpendicularly with respect to the plane of the drawing, and second axis 102 as well as main plane of extension 100 of the substrate extends horizontally in the plane of the drawing. The rotational vibration of first Coriolis element 3a and of second Coriolis element 3b is symbolized by the arrows. Detection devices 4 are situated on the left side of first Coriolis element 3a and on the right side of second Coriolis element 3b; first deflection element 7a is situated between detection device 4 illustrated on the left and first Coriolis element 3a, and second deflection element 7b is situated between detection device 4 illustrated on the right and second Coriolis element 3b. FIG. 6b illustrates a top view of a micromechanical structure 1 according to the example of the first specific embodiment. Substrate 2 is not illustrated here for reasons of clarity. FIG. 6c shows micromechanical structure 1, illustrated in FIGS. 6a and 6b, according to the example of the first specific embodiment, the case of a rotation rate X about a direction which extends horizontally in the plane of the drawing being illustrated here. In this case, a Coriolis force acts on first Coriolis element 3a and second Coriolis element 3b when these undergo a rotational vibration, driven by drive devices 5, about first axis 101, which extends perpendicularly in the plane of the drawing. Due to the Coriolis force, first Coriolis element 3a and second Coriolis element 3b undergo a deflection in parallel to main plane of extension 100 of substrate 2, in the sense of a rotational movement about third axis 103. This third axis 103 extends in the plane of the drawing in the vertical direction. A corresponding coupling transfers this action of force to first deflection element 7a and to second deflection element 7b, as the result of which these likewise experience an action of force in the sense of a rotational movement about third axis 103. This action of force may be detected by detection devices 4, either in closed-loop operation by a corresponding electrical counterforce, or in open-loop operation by a change in capacitance due to a deflection of the counter finger electrodes of first deflection element 7a and of second deflection element 7b relative to the finger electrodes of detection devices 4. FIG. 6d illustrates the same situation as in FIG. 6c, in a top view perpendicular to main plane of extension 100.

Figure 7A:
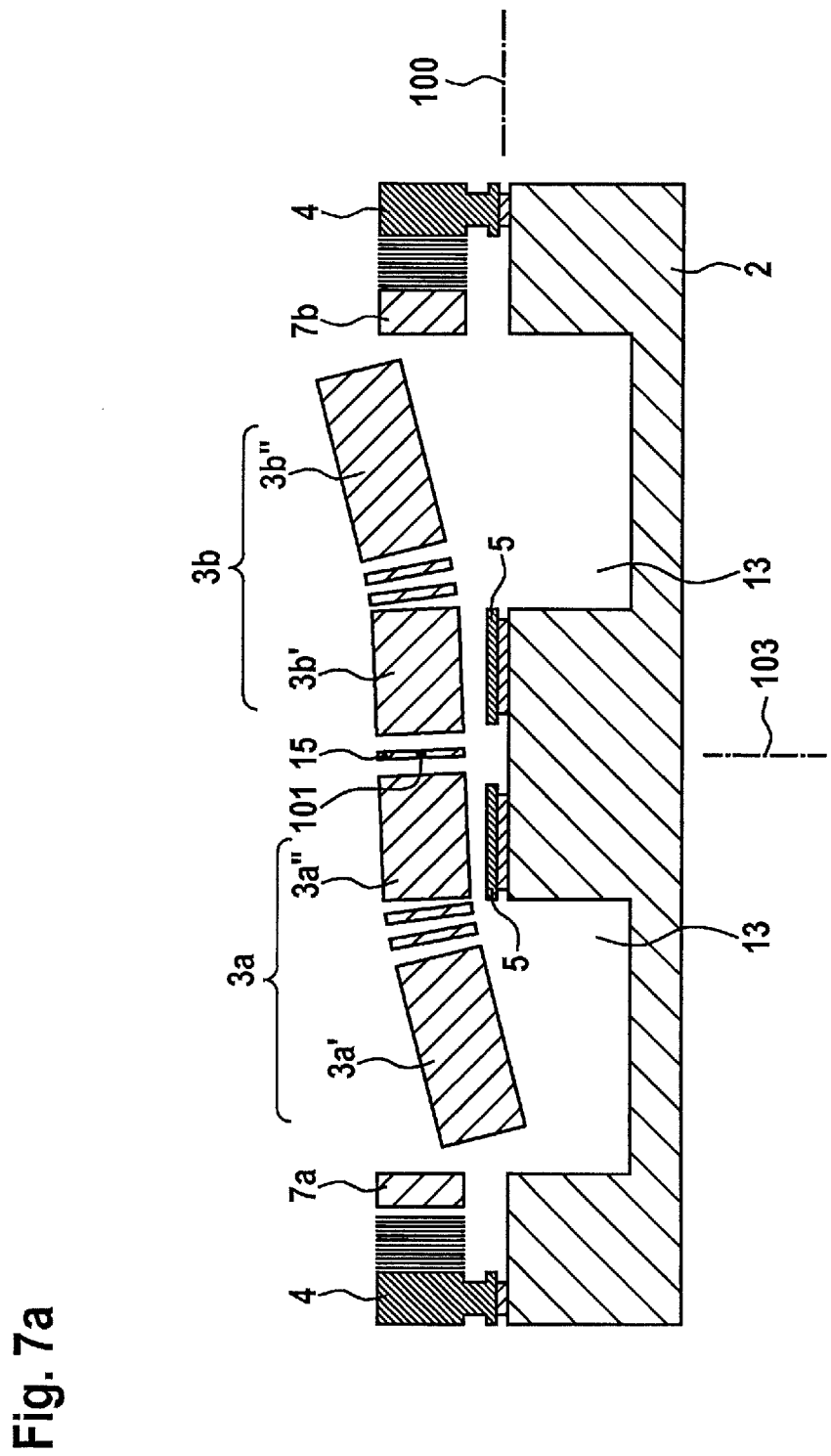
FIGS. 7a through 7b show schematic representations according to an example of a second specific embodiment of the micromechanical structure according to the present invention.
Figure 7B:
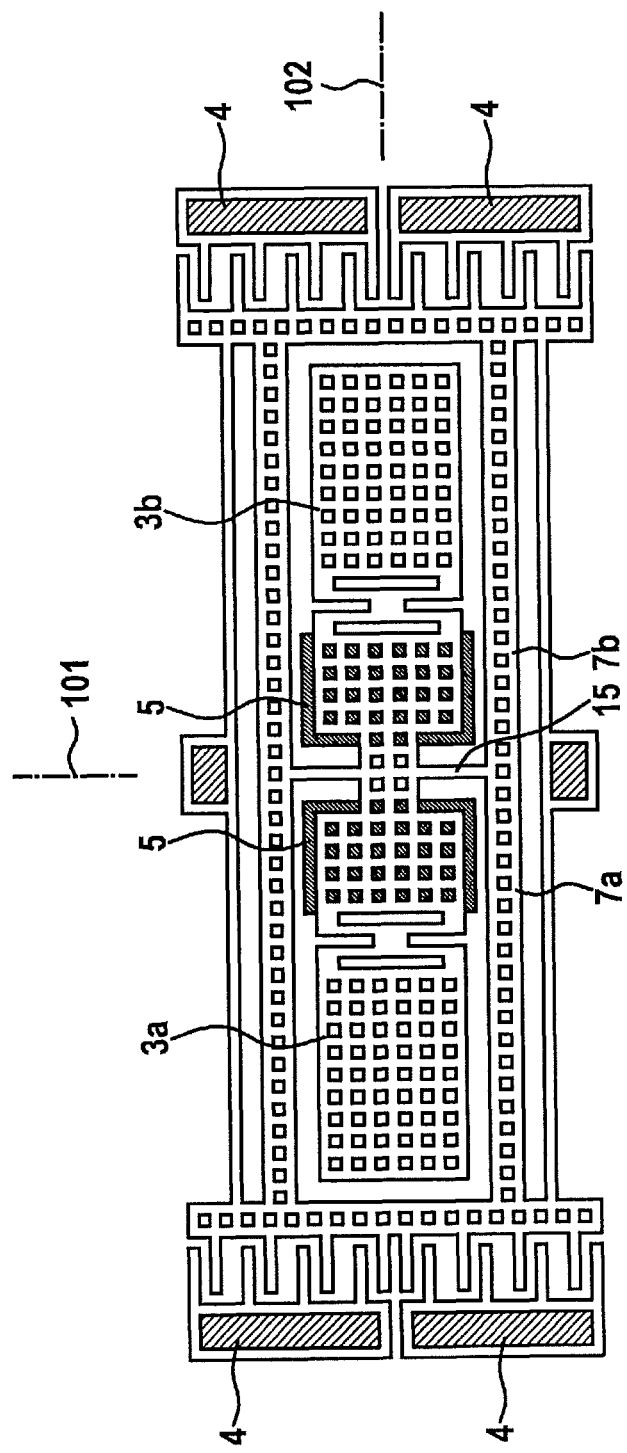

FIGS. 7a and 7b each show a schematic representation of a micromechanical structure 1 according to an example of a second specific embodiment. The example of the second specific embodiment essentially corresponds to the example of the first specific embodiment, first Coriolis element 3a and second Coriolis element 3b each including multiple segments, and adjacent segments being coupled to one another, in particular by further torsion springs. In the example in FIGS. 7a and 7b, first Coriolis element 3a includes a first segment 3a' and a second segment 3a". Similarly, second Coriolis element 3b includes a third segment 3b' and a fourth segment 3b". The further torsion springs are designed for allowing tilting of first segment 3a' relative to second segment 3a", and of third segment 3b' relative to fourth segment 3b", about axes which are in parallel to first axis 101 (corresponding to a comparatively soft coupling), and for preferably preventing relative rotations about the other spatial directions (corresponding to a comparatively hard coupling). Due to the segmentation of first Coriolis element 3a and of second Coriolis element 3b, during resonant rotational vibration the vibration travel of the segments situated farthest from first axis 101 (first segment 3a' and fourth segment 3b") is increased, resulting in a stronger action of force by the Coriolis force, and thus a stronger action of force in the sense of a rotational vibration about third axis 103 of first deflection element 7a and of second deflection element 7b. This in turn results in a better signal-to-noise ratio, as the result of which rotation rate X may be measured more accurately, and in particular also fairly small rotation rates X may be measured. In addition, the example of the second specific embodiment differs from the example of the first specific embodiment of micromechanical structure 1 according to the present invention in that micromechanical structure 1 includes a total of four detection devices 4; for first deflection element 7a, two detection devices 4 are situated next to one another and symmetrically with respect to second axis 102, and the two other detection devices 4 are correspondingly situated symmetrically with respect to first axis 101. A particularly high level of insensitivity to error signals is thus possible by comparing the signals of the four detection devices 4.

Figure 8B:
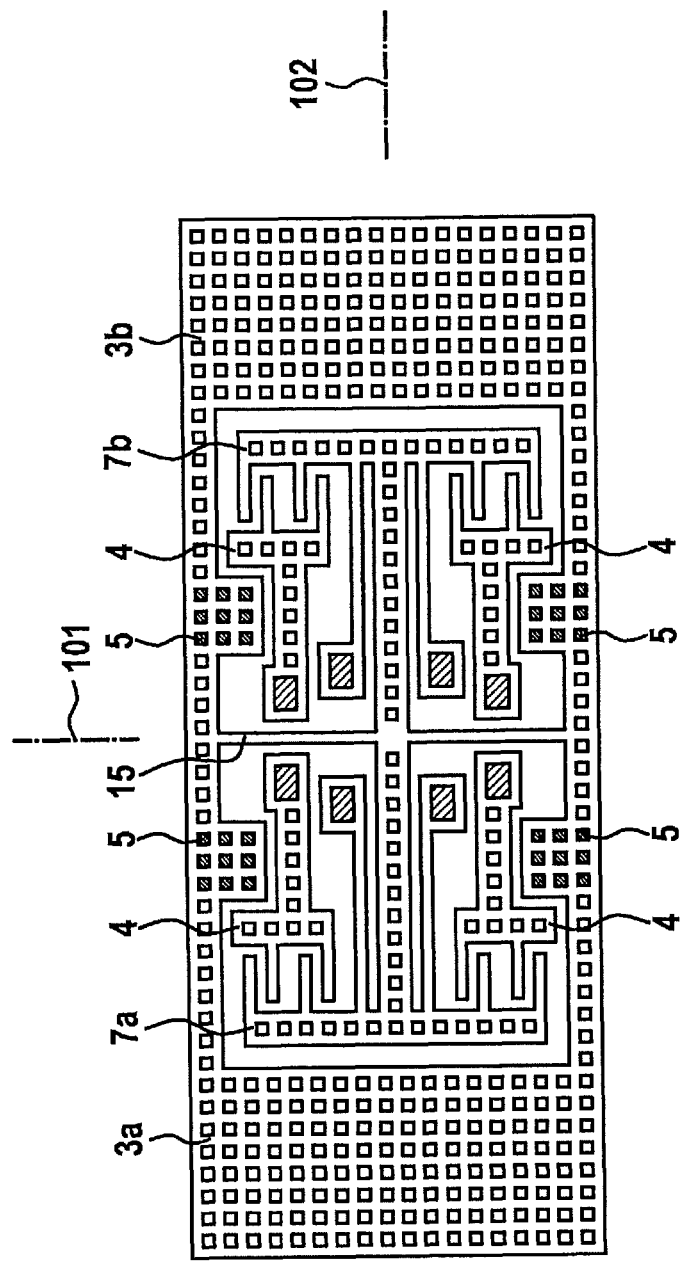
Figure 8C:
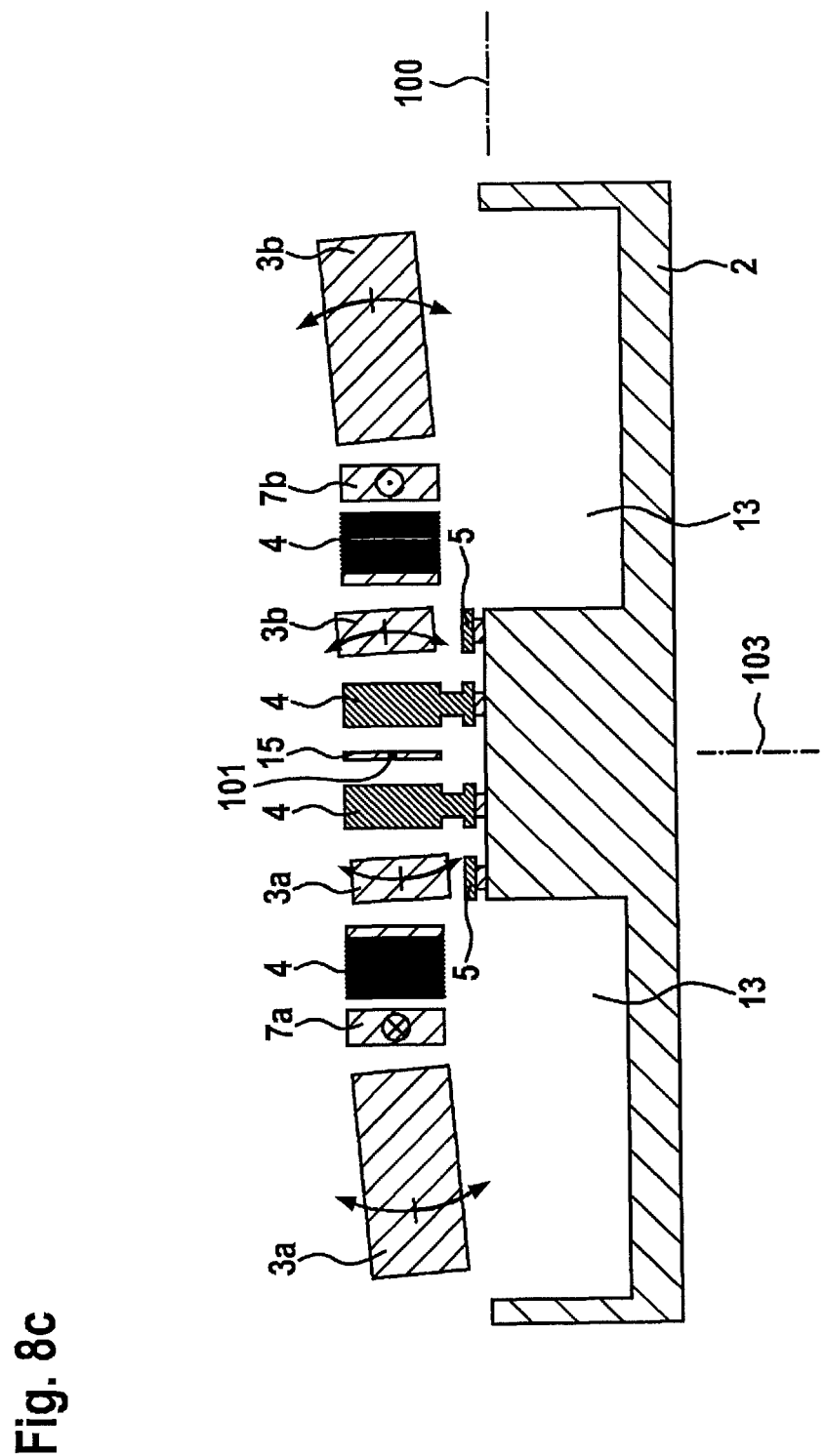
Figure 8D:
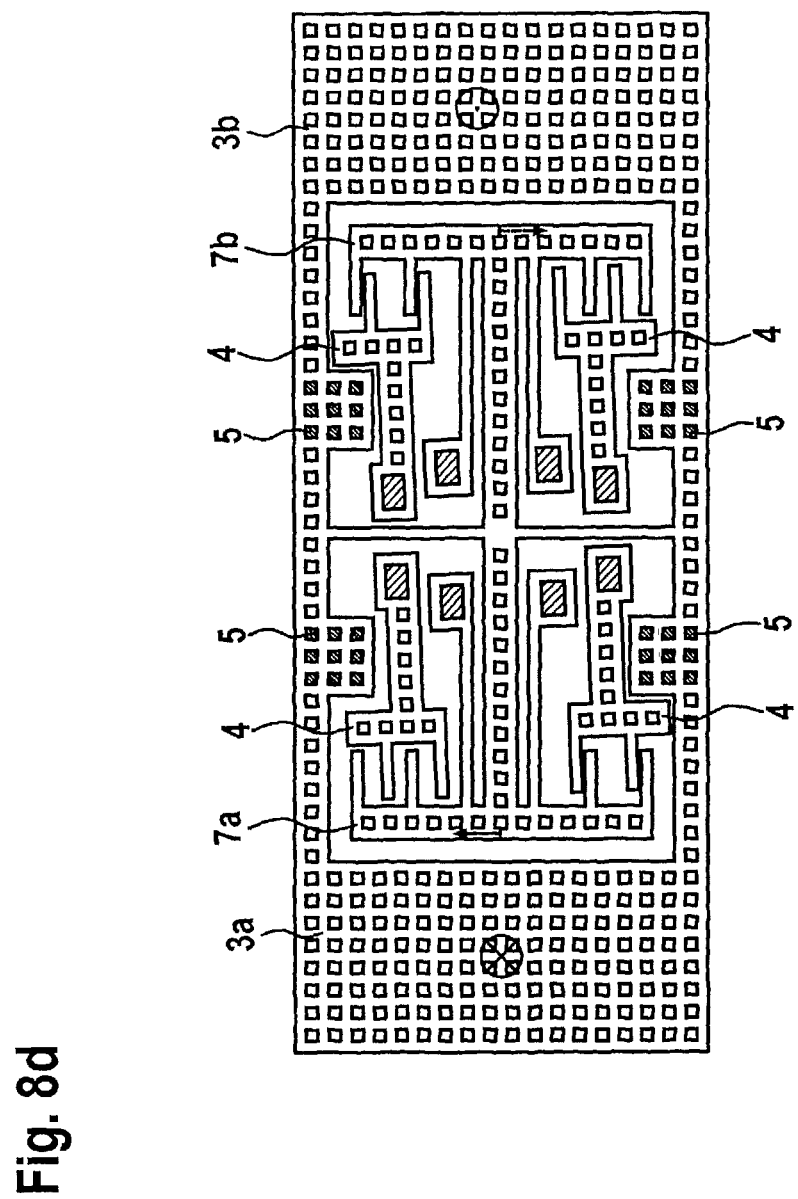

FIGS. 8a through 8d show a schematic representation of a micromechanical structure 1 according to an example of a third specific embodiment. FIGS. 8a and 8b illustrate micromechanical structure 1 in the neutral position, and FIGS. 8c and 8d illustrate micromechanical structure 1 in the case of a rotation rate X which acts in parallel to a projection of second axis 102 onto main plane of extension 100. The example of the third specific embodiment, the same as the first specific embodiment, has no segmentation of first Coriolis element 3a and of second Coriolis element 3b, but includes four detection devices 4 as in the second specific embodiment, in addition drive devices 5 as well as detection devices 4 being situated in the vicinity of first axis 101, so that the suspension of the elements on substrate 2 takes place in a comparatively narrow spatial area, resulting in a high level of insensitivity to mechanical tensions on the component or on the micromechanical structure. In addition, first Coriolis element 3a and second Coriolis element 3b have a frame-like design in the example of the third specific embodiment, and frame first deflection element 7a and second deflection element 7b, while the converse is true for the examples of the first and second specific embodiments.

Figure 9:
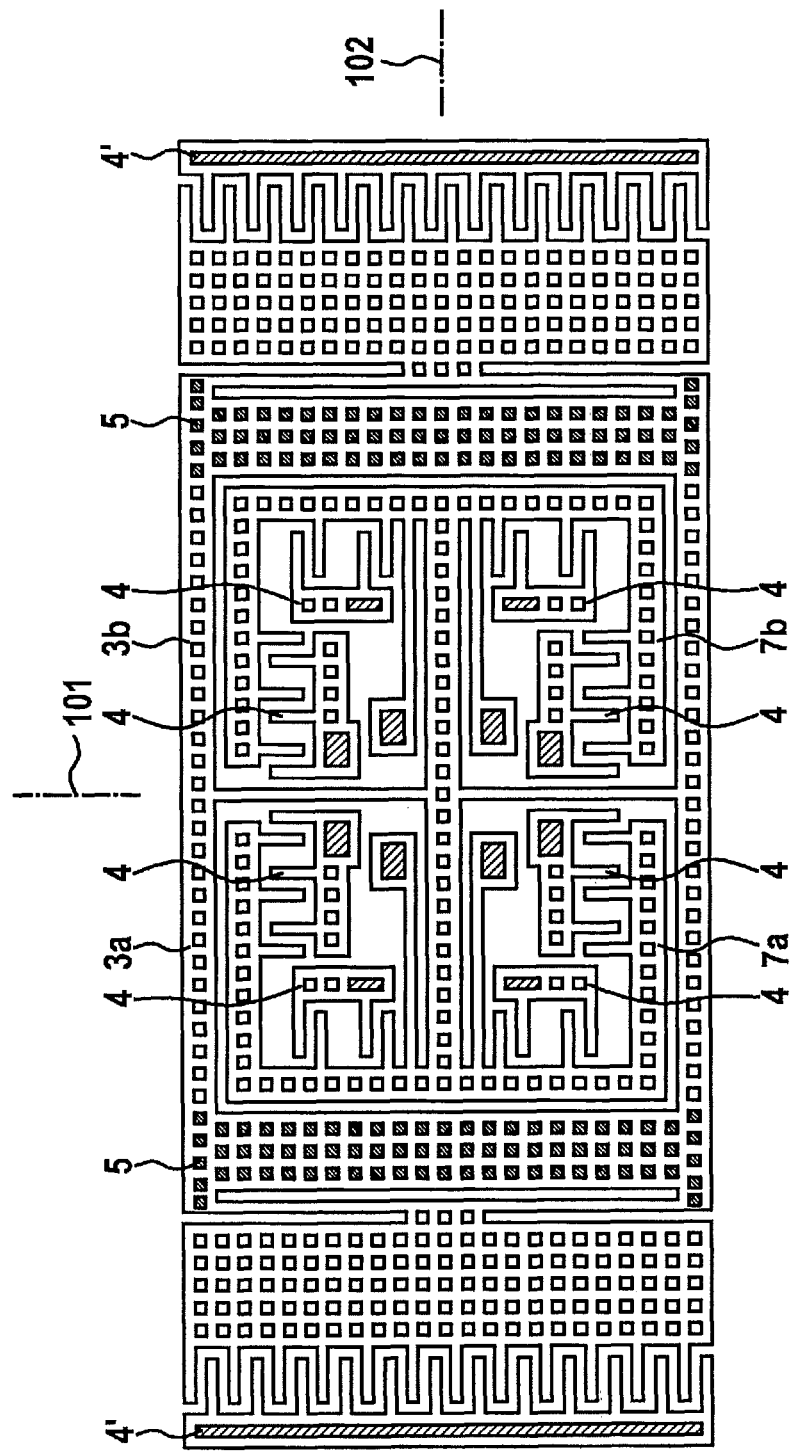
FIG. 9 shows a schematic representation according to an example of a fourth specific embodiment of the micromechanical structure according to the present invention.

FIG. 9 shows a schematic representation of a micromechanical structure 1 according to an example of a fourth specific embodiment. The example of the fourth specific embodiment, similarly as for the second specific embodiment, includes a segmentation of first Coriolis element 3a and of second Coriolis element 3b, and similarly as for the third specific embodiment, includes internally situated first deflection element 7a and internally situated second deflection element 7b, "internally situated" meaning that Coriolis element 3 has a frame-shaped design and surrounds first deflection element 7a and second deflection element 7b, whereby according to the fourth specific embodiment, the segment of first Coriolis element 3a, i.e., first segment 3a', and the segment of second Coriolis element 3b, i.e., fourth segment 3b", situated farthest from first axis 101 include certain counter finger electrodes for engaging with corresponding finger electrodes of further detection devices 4'. In addition, according to the fourth specific embodiment, micromechanical structure 1 also includes central detection devices 4 which detect the deflection (or action of force) of first deflection elements 7a and second deflection elements 7b, which are supported similarly as for the third specific embodiment.

Figure 10:
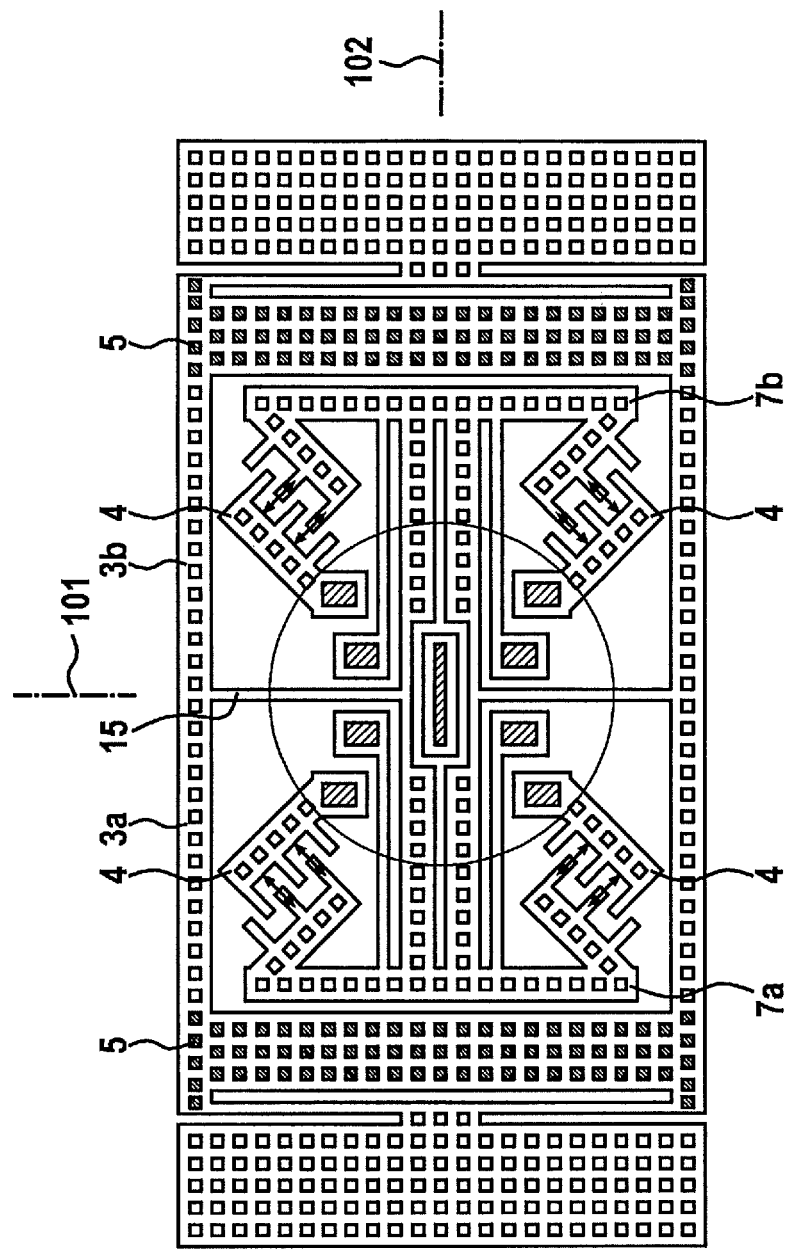
FIG. 10 shows a schematic representation according to an example of a fifth specific embodiment of the micromechanical structure according to the present invention.

FIG. 10 shows a schematic representation according to an example of a fifth specific embodiment of micromechanical structure 1 according to the present invention. The example of the fifth specific embodiment essentially corresponds to the fourth specific embodiment, the substrate suspension being implemented here essentially within an imaginary circle around the intersection point of first axis 101 and second axis 102, the circle having a radius which is preferably less than one-half the extension of first Coriolis element 3a in the direction of second axis 102, particularly preferably less than one-third of the extension of first Coriolis element 3a in the direction of second axis 102, and very particularly preferably less than one-fourth the extension of first Coriolis element 3a in the direction of second axis 102. Here as well, first Coriolis element 3a and second Coriolis element 3b include multiple segments. A particularly high level of insensitivity to mechanical and/or thermal tensions is made possible due to the very central fastening to the substrate.

Figure 11B:
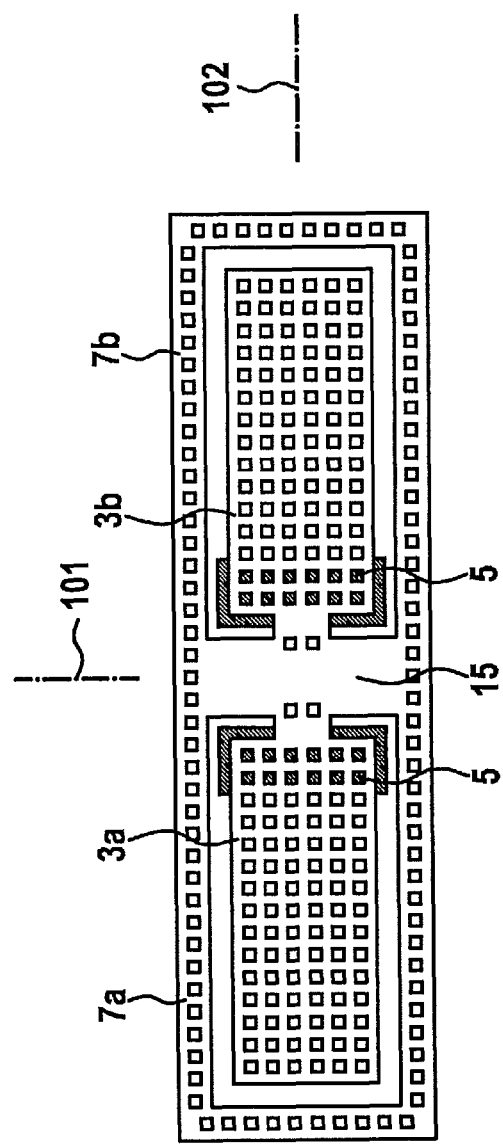
FIGS. 11a through 15 show schematic representations of examples of embodiment variants of the micromechanical structure according to the present invention with regard to the torsion spring, using the example of the first specific embodiment.
Figure 12A:
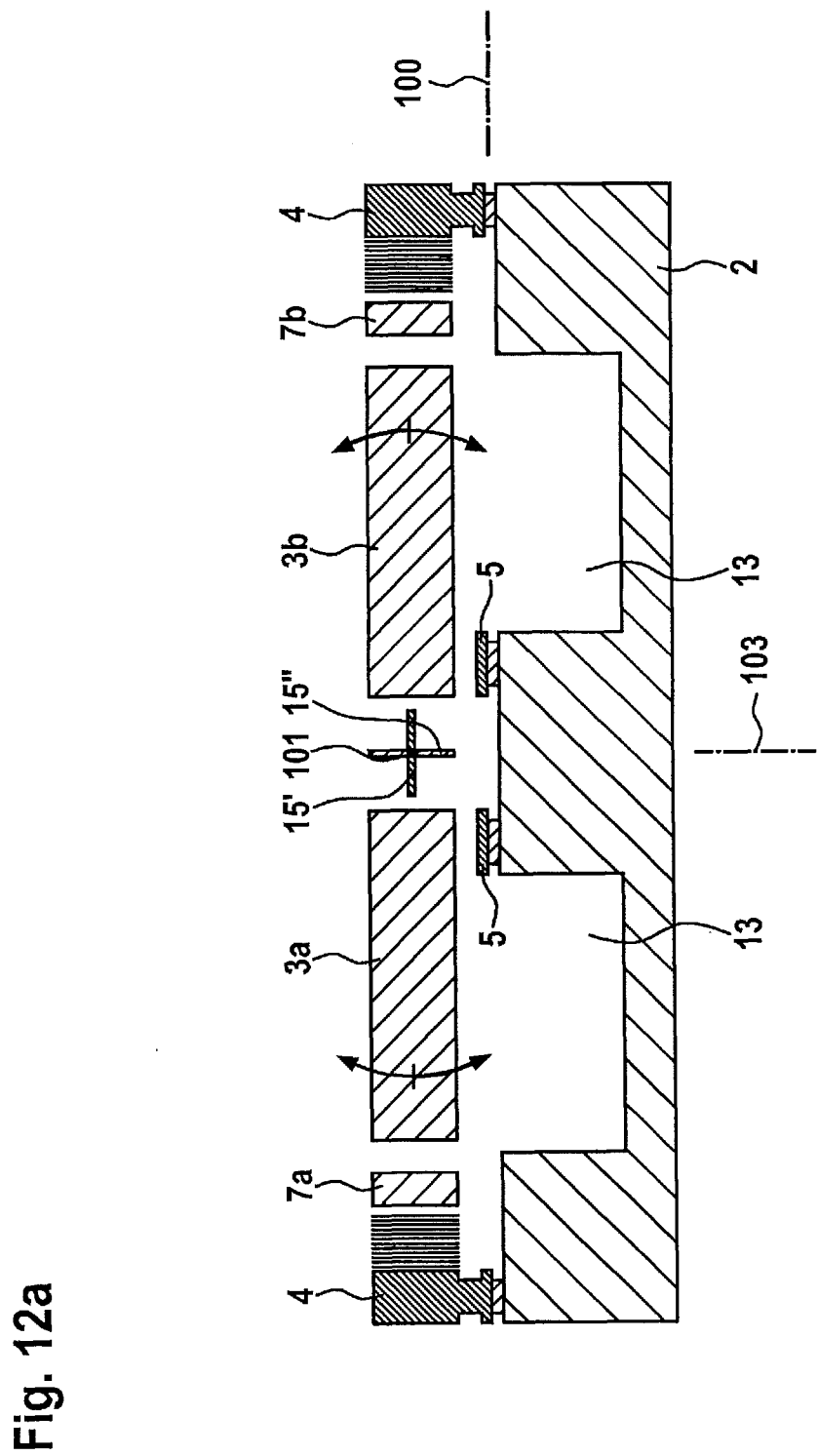
Figure 12B:
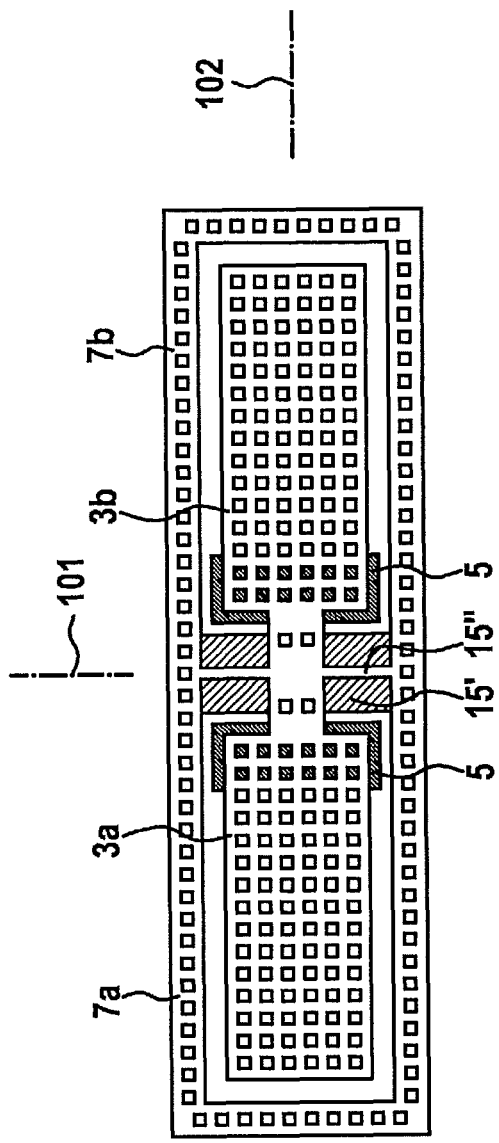
Figure 13A:
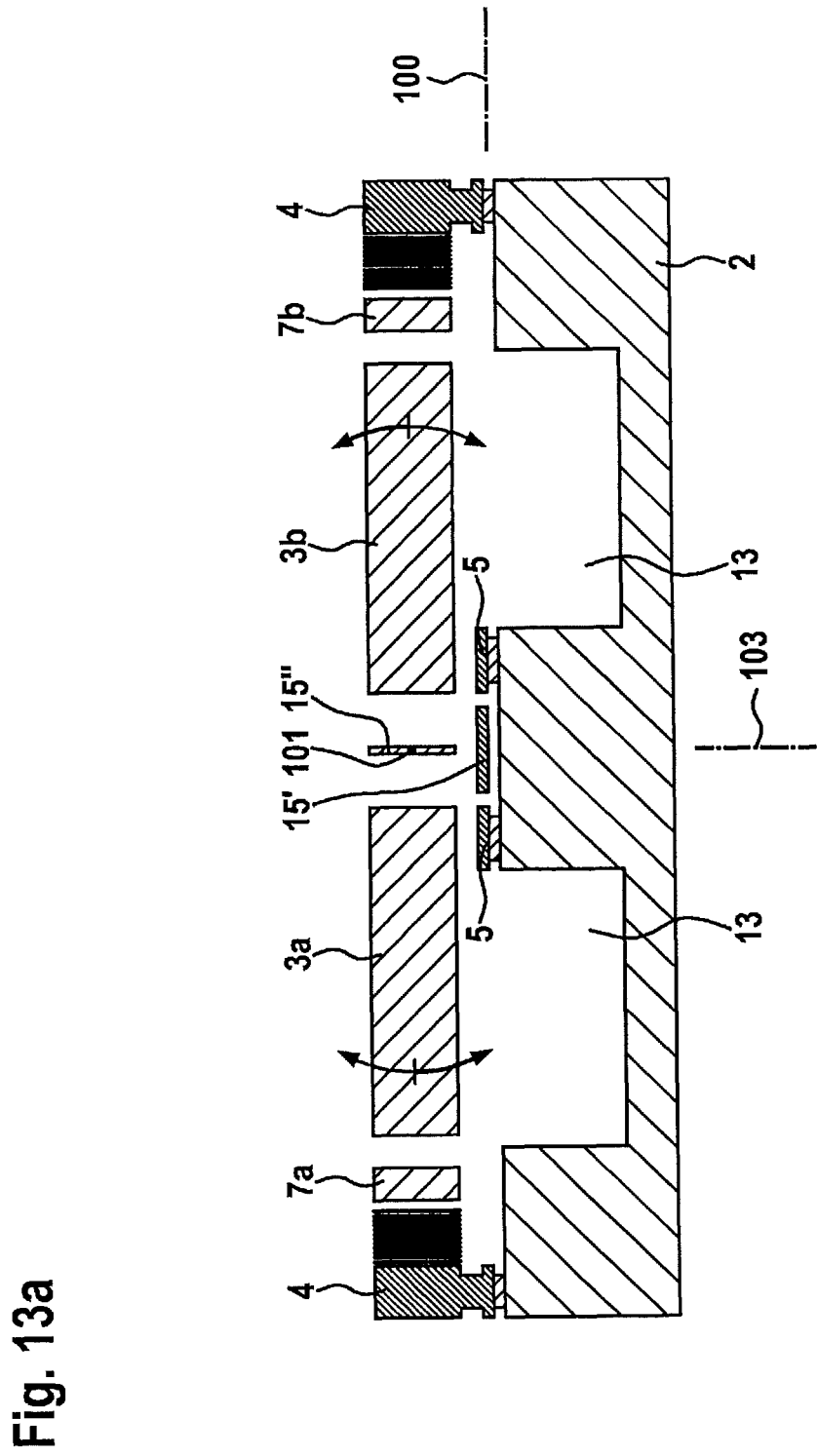
Figure 13B:
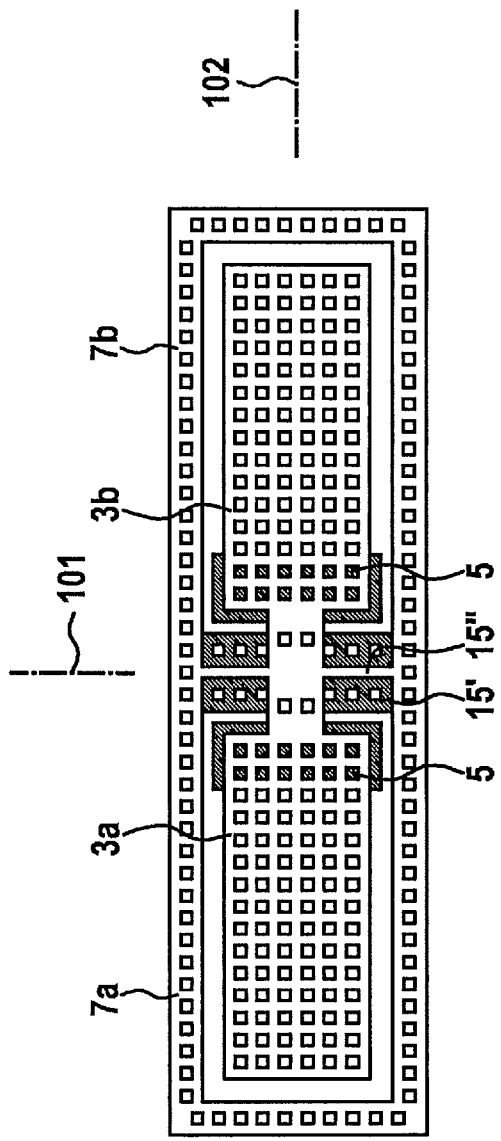
Figure 14:
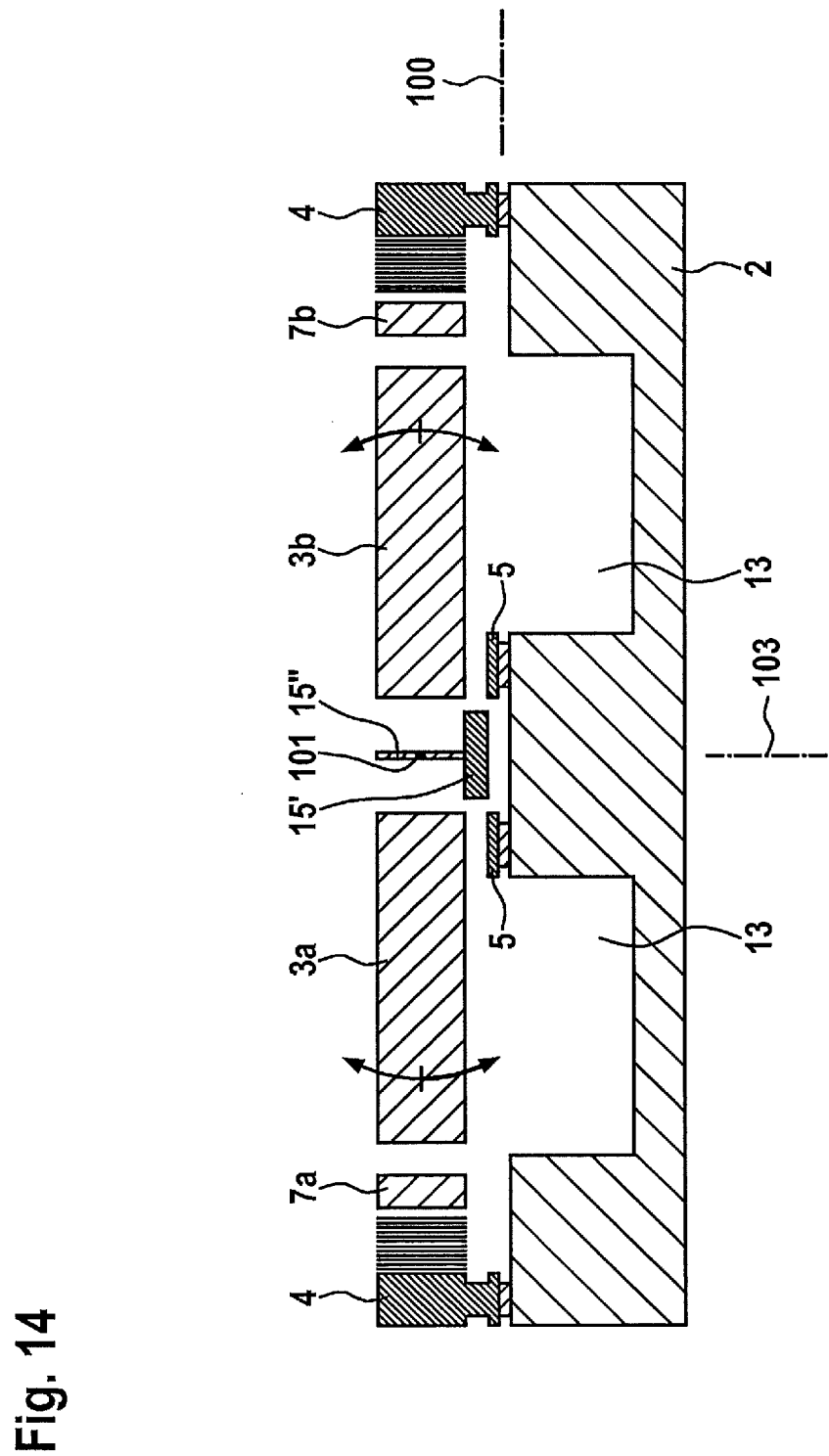
Figure 15:
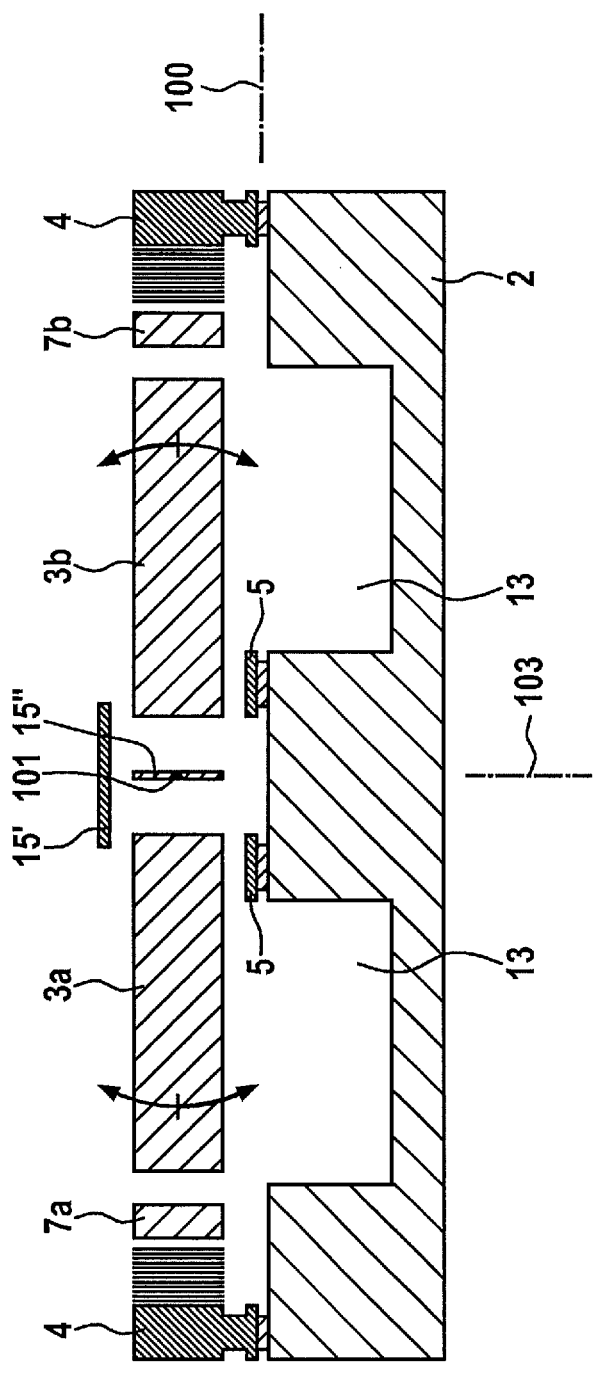

FIGS. 11a through 15 show schematic representations according to examples of embodiment variants of micromechanical structure 1 according to the present invention with regard to torsion spring 15, using the example of the first specific embodiment. FIGS. 11a, 12a, 13a, 14, and 15 show sectional views along a plane transverse to first axis 101. FIGS. 11b, 12b, and 13b show top views onto main plane of extension 100 of substrate 2. In all of these embodiment variants, torsion spring 15 includes a first torsion spring element 15' and a second torsion spring element 15", first torsion spring element 15' and second torsion spring element 15" having a main direction of extension along the direction of first axis 101. Transverse to first axis 101, i.e., in the cross section, first torsion spring element 15' as well as second torsion spring element 15" have an essentially rectangular design; i.e., in addition to the main direction of extension, they have a second and a third direction of extension, the extension in the second direction of extension in each case being smaller than the extension in the main direction of extension, and the extension in the third direction of extension being smaller than the extension in the second direction of extension. The rectangles corresponding to the cross section of torsion spring elements 15', 15" are perpendicular to one another in all embodiment variants; i.e., their respective second directions of extension are perpendicular to one another in the section plane. In the embodiment variants according to FIGS. 11a, 11b, 12a, and 12b, the center points of the rectangles corresponding to the cross section of torsion spring elements 15', 15" coincide; i.e., in the cross section, torsion spring 15 has a shape of a cross in relation to the section plane. In FIGS. 11a and 11b, the second directions of extension in the section plane are at an angle of approximately 45° with respect to the direction of third axis 103. In the embodiment variants according to FIGS. 12a and 12b, the second direction of extension of first torsion spring element 15' in the neutral position is in parallel to main plane of extension 100, and the second direction of extension of second torsion spring element 15" is situated in the direction of third axis 103. First torsion spring element 15' in particular is made of a further polysilicon layer. In the embodiment variants according to FIGS. 13a, 13b, 14, and 15, first torsion spring element 15' is situated in parallel to main plane of extension 100, and second torsion spring element 15" is situated along the direction of third axis 103, the center points of the rectangles which correspond to the cross section of torsion spring elements 15', 15" not coinciding, and first torsion spring element 15' in FIGS. 13a, 13b, and 14 being situated below second torsion spring element 15", i.e., in the area of the side of first Coriolis element 3a and of second Coriolis element 3b facing the substrate, and in FIG. 15 being situated above second torsion spring element 15", i.e., in the area of the side of first Coriolis element 3*a* and of second Coriolis element 3*b* facing away from the substrate. In the embodiment variants according to FIGS. 13*a* and 13*b*, first torsion spring element 15' in particular is made of polysilicon layer 11, as the result of which an additional manufacturing step is advantageously dispensed with. In the embodiment variants according to FIGS. 14 and 15, first torsion spring element 15' in particular is made of a further polysilicon layer, the thickness of further polysilicon layer, and thus of first torsion spring element 15' (respectively in the third direction of extension of first torsion spring element 15') being adjustable during manufacture in such a way that first torsion spring element 15' has certain characteristics, in particular a certain spring constant. In the embodiment variant according to FIG. 14, first torsion spring element 15' and second torsion spring element 15" are connected to one another across their entire extension along the main direction of extension (corresponding to the direction of first axis 101 extending perpendicularly with respect to the plane of the drawing), or are connected to torsion spring 15 only at the particular suspension points on substrate 2 and in the area of the connection of first Coriolis element 3*a* and of second Coriolis element 3*b*. Each of the described embodiment variants is combinable with the first to fifth specific embodiments.

In all specific embodiments, it is preferred that the rotational vibration of the Coriolis elements takes place resonantly or partially resonantly. An even more accurate measurement is made possible in this way. The natural frequency of the detection device is particularly preferably changeable; in particular the natural frequency of the detection device is settable to the drive frequency at which the first and second Coriolis elements are driven. It is thus possible to operate the rotation rate sensor in a particularly sensitive, resonant state in a particularly advantageous manner.

What is claimed is:

1. A micromechanical structure configured as a rotation rate sensor, comprising:
   a substrate having a main plane of extension;
   a first Coriolis element;
   a second Coriolis element;
   at least one drive device for deflecting the first Coriolis element and the second Coriolis element from a neutral position;
   at least one detection device;
   at least one first deflection element; and
   at least one second deflection element;
   wherein:
      the first Coriolis element, with regard to a first axis extending in parallel to the main plane of extension, has a mass-symmetrical design with respect to the second Coriolis element;
      the first Coriolis element and the second Coriolis element have a common main plane of extension;
      in the neutral position the common main plane of extension extends in parallel to the main plane of extension of the substrate;
      the first Coriolis element and the second Coriolis element each have a mass-symmetrical design with respect to a second axis extending perpendicularly with respect to the first axis;
      the first Coriolis element and the second Coriolis element being drivable by the drive device to undergo a rotational vibration about the first axis;
      in the case of a rotation rate acting in parallel to the projection of the second axis onto the main plane of extension to provide an action of force of a Coriolis force, in the sense of a rotational vibration, the first Coriolis element and the second Coriolis element being deflectable about a third axis extending perpendicularly with respect to the main plane of extension and extending through an intersection point of the first axis and the second axis;
      the first deflection element and the second deflection element having a mass-symmetrical design with respect to the first axis and with respect to the second axis;
      the first deflection element is coupled at least to the first Coriolis element, and the second deflection element is coupled at least to the second Coriolis element, in such a way that the action of force of the Coriolis force on the first Coriolis element and on the second Coriolis element, in the sense of a rotational vibration of the first deflection element and of the second deflection element about the third axis, is detectable by the detection device;
      the drive device includes electrodes having a main plane of extension in parallel to the main plane of extension of the substrate and being located between the substrate and at least one of the first and second Coriolis elements, a distance of the drive device from the first axis being less than 40% of the extension of at least one of the first and second Coriolis elements along the second axis; and
      coupling of the first deflection element to the first Coriolis element and of the second deflection element to the second Coriolis element is hard with regard to a rotational vibration about the third axis.

2. The micromechanical structure as recited in claim 1, wherein the first axis includes at least one torsion spring, a length of the torsion spring being greater than a height of the torsion spring, and the height of the torsion spring being greater than a width of the torsion spring.

3. The micromechanical structure as recited in claim 2, wherein the micromechanical structure is formed by a surface micromechanical process.

4. The micromechanical structure as recited in claim 1, wherein the detection device includes electrodes.

5. The micromechanical structure as recited in claim 4, wherein the detection device includes first finger electrodes situated in a comb structure, the first deflection element and the second deflection element including second finger electrodes which mesh with the first finger electrodes.

6. The micromechanical structure as recited in claim 1, wherein at least one of:
   the detection device is situated circumferentially around at least one central substrate suspension;
   the first Coriolis element and the second Coriolis element are situated circumferentially around at least one central substrate suspension; and
   the first deflection element and the second deflection element are situated circumferentially around at least one central substrate suspension.

7. The micromechanical structure as recited in claim 1, wherein:
   the first Coriolis element includes multiple segments, adjacent segments of the first Coriolis element being coupled by torsion springs; and
   the second Coriolis element includes multiple segments, adjacent segments of the second Coriolis element being coupled by torsion springs.

8. The micromechanical structure as recited in claim 1, wherein the substrate has recesses which enable the first Coriolis element and the second Coriolis element to have a larger maximum deflection angle of a rotational vibration than is the case without the recesses.

9. The micromechanical structure as recited in claim 1, wherein:

coupling of the first Coriolis element and of the second Coriolis element with the substrate is (i) soft with regard to a rotational vibration about the first axis and with regard to a rotational vibration about the third axis, and (ii) is hard with regard to a rotational vibration about the second axis;

coupling of the first deflection element and of the second deflection element to the substrate is (iii) soft with regard to a rotational vibration about the third axis, and (iv) hard with regard to a rotational vibration about the first axis and with regard to a rotational vibration about the second axis; and coupling of the first deflection element to the first Coriolis element and of the second deflection element to the second Coriolis element is (v) soft with regard to a rotational vibration about the first axis, and (vi) is hard with regard to a rotational vibration about the second axis.

* * * * *